US010362603B2

(12) United States Patent
Barriac et al.

(10) Patent No.: US 10,362,603 B2
(45) Date of Patent: Jul. 23, 2019

(54) USING RTS/CTS TO ENHANCE NETWORK PERFORMANCE

(71) Applicant: QUALCOMM Incorporated, San Diego, CA (US)

(72) Inventors: Gwendolyn Denise Barriac, Encinitas, CA (US); Yang Yang, Columbus, OH (US); Simone Merlin, Solana Beach, CA (US); George Cherian, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 14/857,762

(22) Filed: Sep. 17, 2015

(65) Prior Publication Data

US 2016/0088618 A1    Mar. 24, 2016

Related U.S. Application Data

(60) Provisional application No. 62/052,402, filed on Sep. 18, 2014.

(51) Int. Cl.
*H04W 72/08* (2009.01)
*H04W 74/08* (2009.01)
*H04W 84/12* (2009.01)

(52) U.S. Cl.
CPC ...... *H04W 74/0816* (2013.01); *H04W 72/085* (2013.01); *H04W 84/12* (2013.01)

(58) Field of Classification Search
CPC .............. H04W 74/0816; H04W 72/085; H04W 84/12
See application file for complete search history.

(56) References Cited

U.S. PATENT DOCUMENTS 7,760,755 B2    7/2010  Ginzburg et al.
8,085,683 B2   12/2011  Leith et al.
(Continued)

FOREIGN PATENT DOCUMENTS

WO    2006106450 A1    10/2006

OTHER PUBLICATIONS

Cheng, Yu-Jen; The Impact of RTS/CTS Exchange on the Performance of Multi-Rate IEEE 802.11 Wireless Networks; Apr. 2008; https://www.iusb.edu/math-compsci/_prior-thesis/YJCheng_thesis.pdf.*

(Continued)

*Primary Examiner* — Alex Skripnikov
*Assistant Examiner* — Richard Schnell
(74) *Attorney, Agent, or Firm* — Arent Fox, LLP and Qualcomm, Incorporated

(57) ABSTRACT

In an aspect of the disclosure, a method, a computer-readable medium, and an apparatus are provided. The apparatus may be an AP. The AP determines an interference metric of a BSS having a plurality of STAs. The AP is in the BSS. The interference metric indicates a degree of interference in the BSS caused by one or more hidden nodes associated with the plurality of STAs. The AP determines whether the interference metric meets a threshold. The AP transmits, to the plurality of STAs, a frame including an indicator when the interference metric meets the threshold. The indicator indicates to each of the plurality of STAs to enable a medium reserving procedure. The medium reserving procedure reserves a medium for data transmission.

17 Claims, 13 Drawing Sheets

(56) References Cited

U.S. PATENT DOCUMENTS

| | | | |
|---|---|---|---|
| 2003/0128659 A1* | 7/2003 | Hirsch | H04L 5/1453 370/208 |
| 2005/0058151 A1* | 3/2005 | Yeh | H04W 52/46 370/445 |
| 2006/0014496 A1 | 1/2006 | Klein | |
| 2007/0133447 A1* | 6/2007 | Wentink | H04W 74/002 370/310 |
| 2008/0176519 A1 | 7/2008 | Kwak et al. | |
| 2009/0225682 A1* | 9/2009 | Grote-Lopez | H04L 41/083 370/255 |
| 2011/0086664 A1 | 4/2011 | Li et al. | |
| 2014/0050156 A1* | 2/2014 | Chan | H04W 76/025 370/329 |
| 2015/0131435 A1* | 5/2015 | Kasslin | H04W 84/12 370/230 |
| 2015/0254195 A1* | 9/2015 | Rison | G06F 13/24 710/260 |
| 2015/0264710 A1* | 9/2015 | Kneckt | H04W 72/0446 370/336 |
| 2016/0066198 A1* | 3/2016 | Wang | H04W 16/28 370/338 |

OTHER PUBLICATIONS

IEEE; IEEE Standard for Information Technology—Telecommunications and information exchange between systems—Local and metropolitan area—Specific requirements, Part 11: Wireless LAN Medium Access Control (MAC) and Physical Layer (PHY) Specifications; Mar. 8, 2007; https://ieeexplore.ieee.org (Year: 2007).*

Abusubaih M., et al., "Collaborative Setting of RTS/CTS in Multi-Rate Multi-BSS IEEE 802.11 wireless LANs", 16th IEEE Workshop on Local And Metropolitan Area Networks, XP055153629, Sep. 1, 2008, pp. 31-36, DOI: 10.1109/LANMAN.2008.4675840, ISBN: 978-1-42-442027-8.

Chen Y., et al., "An RTS-On-Demand Mechanism to Overcome Self-Interference in an 802.11 System", Military Communications Conference, MILCOM 2007, IEEE, Piscataway, NJ, USA, XP031232960, Oct. 29. 2007, pp. 1-7, ISBN: 978-1-4244-1512-0.

Mjidi M., et al., "The Impact of Dynamic RTS Threshold Adjustment for IEEE 802.11 MAC Protocol", International Conference on Communication Technology Proceedings, ICCT 2003, XP055153646, Apr. 11, 2003, pp. 1210-1214, Retrieved from the Internet:URL:http://www.shiratori.riec.tohoku.ac.jp/'deba/PAPER/Journal/mis-draft-dec18.pdf [retrieved on Nov. 18, 2014].

Partial International Search Report—PCT/US2015/050940—ISA/EPO—Nov. 26, 2015 (146857WO).

International Search Report and Written Opinion—PCT/US2015/050940—ISA/EPO—dated Mar. 22, 2016.

Abusubaih M., et al., "A Framework for Interference Mitigation in Multi-BSS 802.11 Wireless LANs," In Proc. Of 10th IEEE International Symposium on a World of Wireless, Mobile and Multimedia Networks (IEEE WoWMoM 2009), Jun. 2009, pp. 1-11.

* cited by examiner

USING RTS/CTS TO ENHANCE NETWORK PERFORMANCE

CROSS-REFERENCE TO RELATED APPLICATION(S)

This application claims the benefit of U.S. Provisional Application Ser. No. 62/052,402, entitled "USING RTS/CTS IN DENSE NETWORKS" and filed on Sep. 18, 2014, which is expressly incorporated by reference herein in its entirety.

BACKGROUND

Field

The present disclosure relates generally to communication systems, and more particularly, to techniques for enabling a medium reserving procedure in a basic service set and using medium reserving procedure frames as a sounding mechanism.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc., frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved narrowband channel selection for devices in a wireless network In an aspect of the disclosure, a method, a computer-readable medium, and an apparatus are provided. The apparatus may be an access point (AP). The AP determines an interference metric of a basic service set (BSS) having a plurality of stations (STAs). The AP is in the BSS. The interference metric indicates a degree of interference in the BSS caused by one or more hidden nodes associated with the plurality of STAs. The AP determines whether the interference metric meets a threshold. The AP transmits, to the plurality of STAs, a frame including an indicator when the interference metric meets the threshold. The indicator indicates to each of the plurality of STAs to enable a medium reserving procedure. The medium reserving procedure reserves a medium for data transmission.

In another aspect of the disclosure, a method, a computer-readable medium, and an apparatus are provided. The apparatus may be an AP or a STA. The apparatus may be a first device. The first device transmits, to a second device, a medium reserving request in accordance with a medium reserving procedure and based on a first modulation and coding scheme (MCS). The medium reserving procedure reserves a medium for data transmission. The first device determines whether a first medium reserving response in accordance with the medium reserving procedure has been received from the second device. The first device determines, when the first medium reserving response has been received by the first device, an MCS supported by the second device based on at least one of (a) a second MCS based on which the first medium reserving response is transmitted or (b) an indication included in the first medium reserving response.

DETAILED DESCRIPTION

Figure 1:
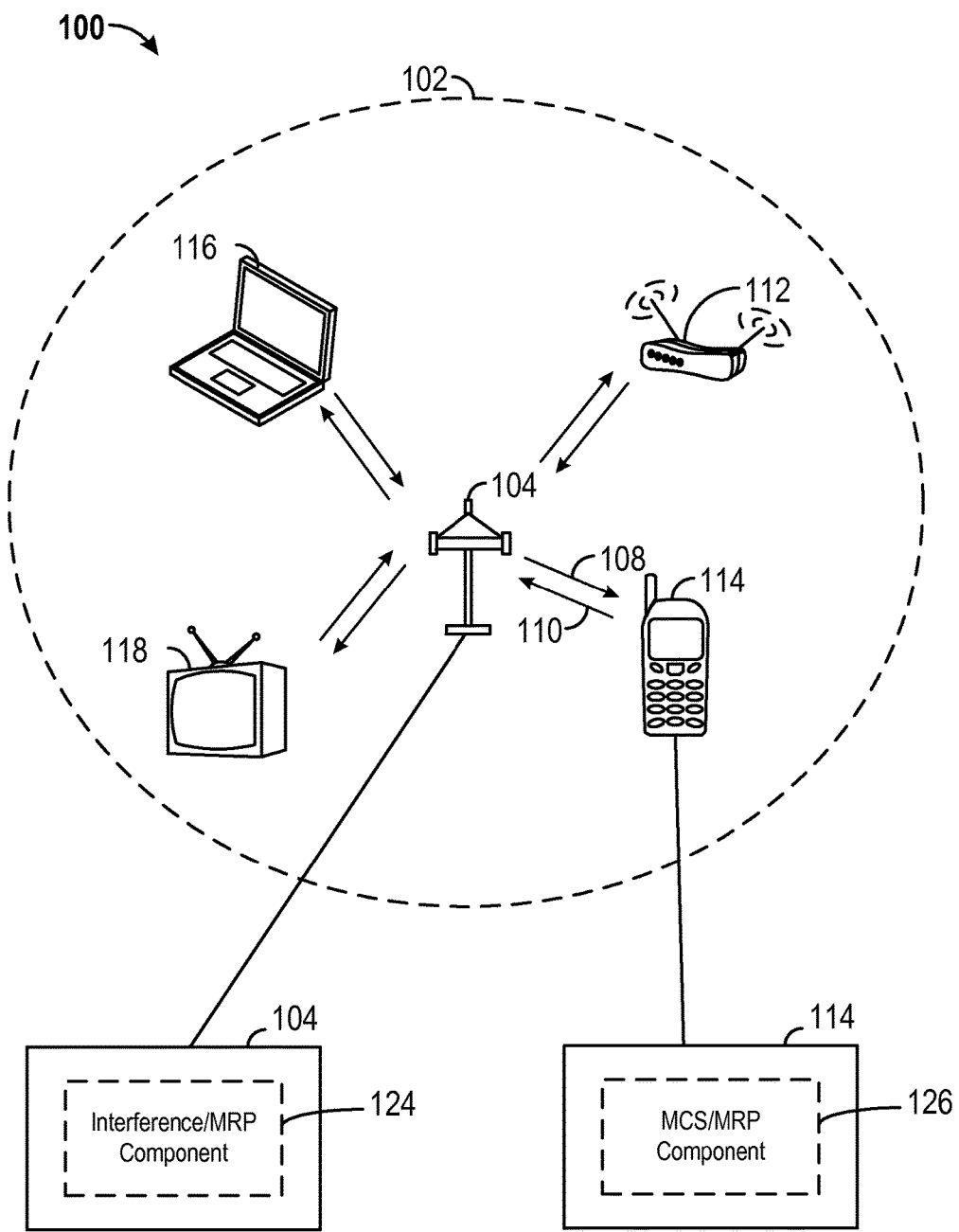
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol may be used for sensors, metering, and smart grid networks. Advantageously, aspects of certain devices implementing the IEEE 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., WiFi) connectivity. MIMO exploits a radiowave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams, and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the IEEE 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Certain of the devices described herein may further implement Multiple Input Multiple Output (MIMO) technology and be implemented as part of the IEEE 802.11 standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min[N_T, N_R]$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 shows an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. The AP 104 may include an interference/MRP component 124. In one aspect, the interference/MRP component 124 may control a process of determining an interference metric of a BSS having a plurality of STAs. The AP 104 is in the BSS. The interference metric indicates a degree of interference in the BSS caused by one or more hidden nodes associated with the plurality of STAs. The interference/MRP component 124 may control a process of determining whether the interference metric meets a threshold. The interference/MRP component 124 may control a process of transmitting, to the plurality of STAs, a frame including an indicator when the interference metric meets the threshold. The indicator indicates to each of the plurality of STAs to enable a medium reserving procedure. The medium reserving procedure reserves a medium for data transmission.

In another aspect, the AP 104 may be a first device. The interference/MRP component 124 may control a process of transmitting, to a second device, a medium reserving request in accordance with a medium reserving procedure and based on a first MCS. The medium reserving procedure reserves a medium for data transmission. The interference/MRP component 124 may control a process of determining whether a first medium reserving response in accordance with the medium reserving procedure has been received from the second device. The interference/MRP component 124 may control a process of determining, when the first medium reserving response has been received by the first device, an MCS supported by the second device based on at least one of (a) a second MCS based on which the first medium reserving response is transmitted or (b) an indication included in the first medium reserving response.

The STA 114 may include one or more components for performing various functions. For example, the STA 114 may include an MCS/MRP component 126. The STA 114 may be a first device. The MCS/MRP component 126 may control a process of transmitting, to a second device, a medium reserving request in accordance with a medium reserving procedure and based on a first MCS. The medium reserving procedure reserves a medium for data transmission. The MCS/MRP component 126 may control a process of determining whether a first medium reserving response in accordance with the medium reserving procedure has been received from the second device. The MCS/MRP component 126 may control a process of determining, when the first medium reserving response has been received by the first device, an MCS supported by the second device based on at least one of (a) a second MCS based on which the first medium reserving response is transmitted or (b) an indication included in the first medium reserving response.

Figure 2:
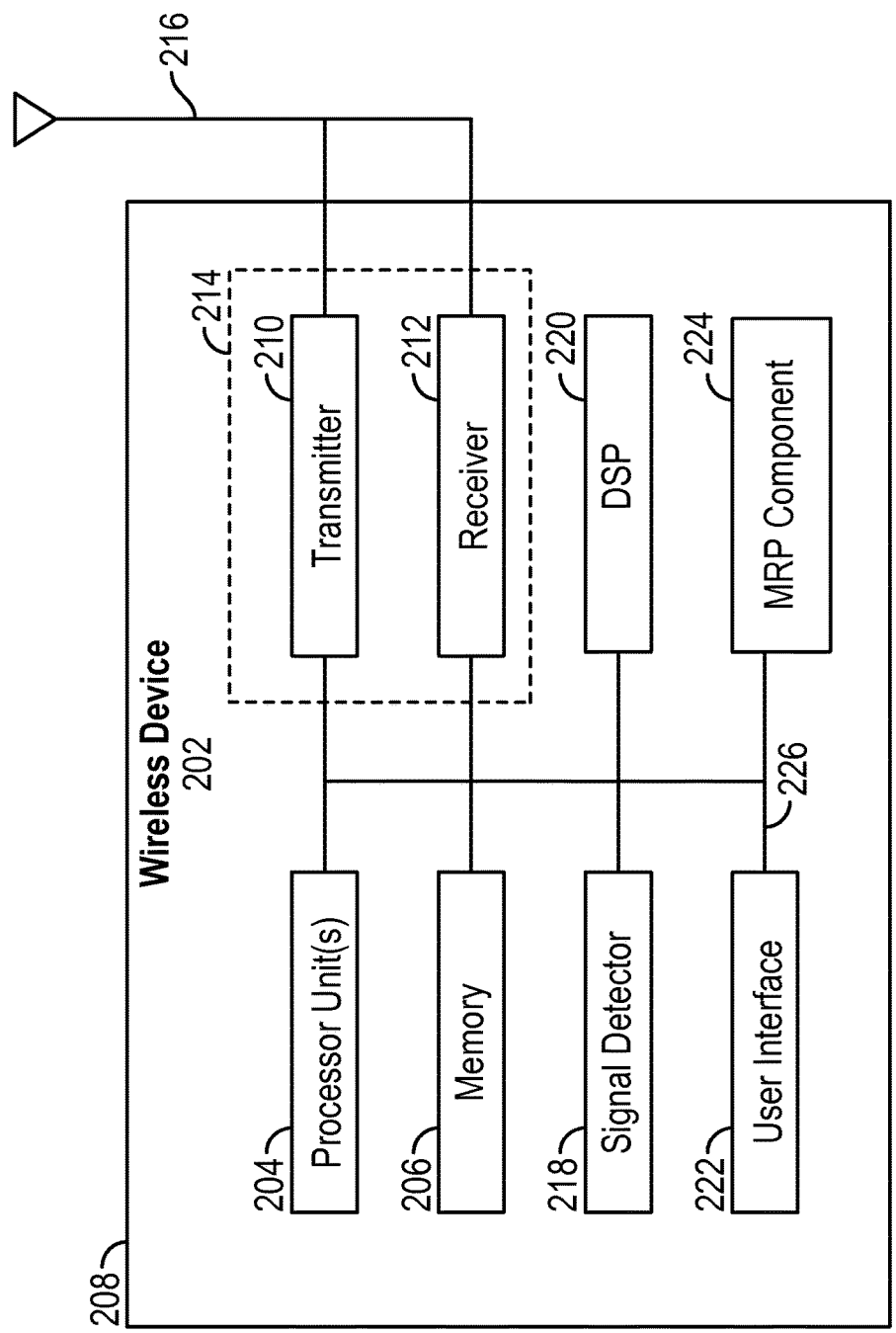
FIG. 2 shows a functional block diagram of an example wireless device that may be employed within the wireless communication system of FIG. 1.

FIG. 2 is a functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or any one of the STAs 112, 114, 116, or 118.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable (by the processor 204, for example) to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote device. The transmitter 210 and the receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214 or the receiver 212. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may also include an MRP component 224. In one aspect, the wireless device 202 may be implemented as an AP. Further, the MRP component 224 may control a process of determining an interference metric of a BSS having a plurality of STAs. The wireless device 202 is in the BSS. The interference metric indicates a degree of interference in the BSS caused by one or more hidden nodes associated with the plurality of STAs. The MRP component 224 may control a process of determining whether the interference metric meets a threshold. The MRP component 224 may control a process of transmitting, to the plurality of STAs, a frame including an indicator when the interference metric meets the threshold. The indicator indicates to each of the plurality of STAs to enable a medium reserving procedure. The medium reserving procedure reserves a medium for data transmission.

In another aspect, the wireless device 202 may be implemented as an AP or a STA. Further, the wireless device 202 may be a first device. The MRP component 224 may control a process of transmitting, to a second device, a medium reserving request in accordance with a medium reserving procedure and based on a first MCS. The medium reserving procedure reserves a medium for data transmission. The MRP component 224 may control a process of determining whether a first medium reserving response in accordance with the medium reserving procedure has been received from the second device. The MRP component 224 may control a process of determining, when the first medium reserving response has been received by the first device, an MCS supported by the second device based on at least one of (a) a second MCS based on which the first medium reserving response is transmitted or (b) an indication included in the first medium reserving response.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218, the DSP 220, the user interface 222, and/or the MRP component 224. Further, each of the components illustrated in FIG. 2 may be implemented using a plurality of separate elements.

Figure 3:
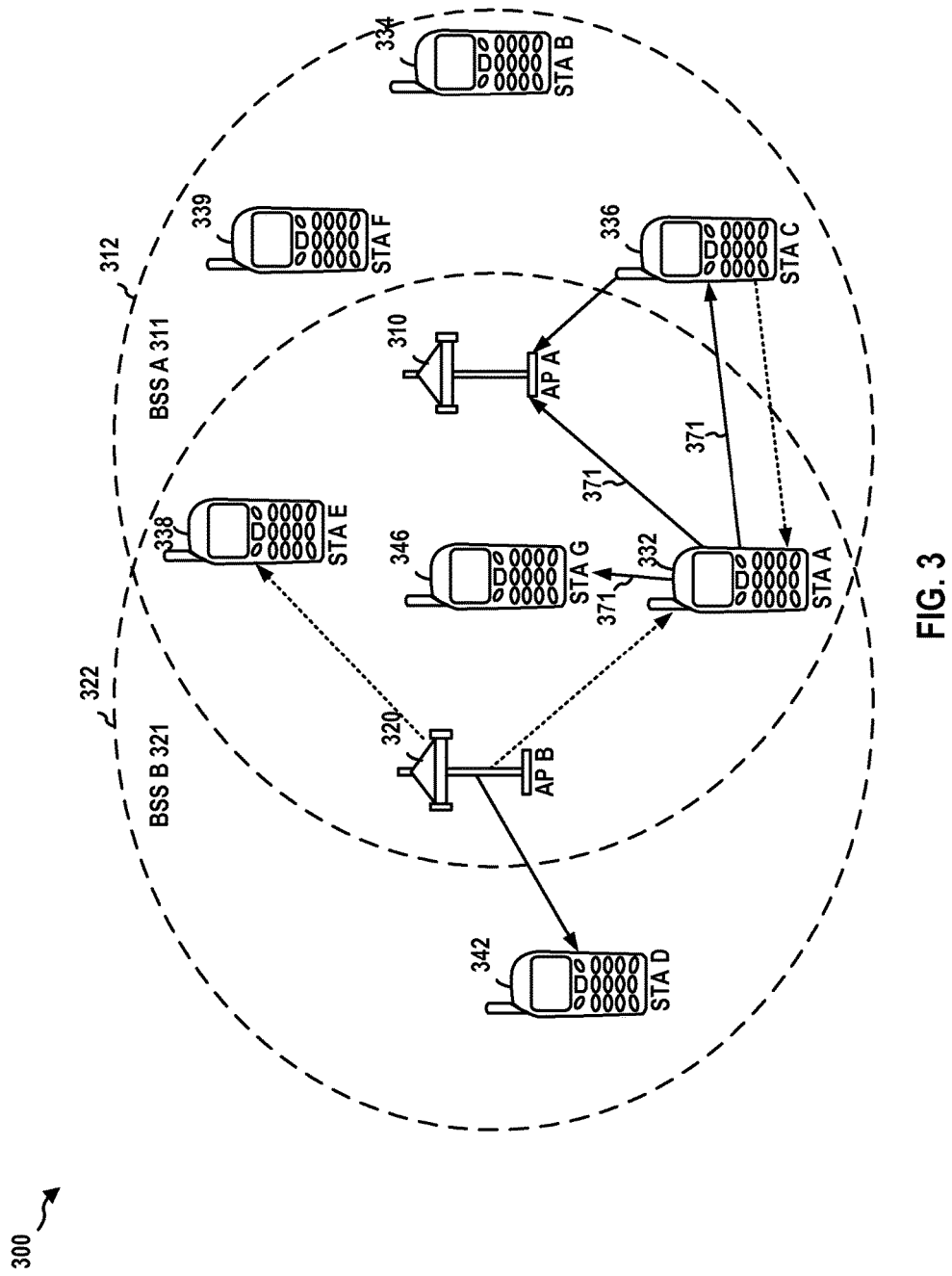
FIG. 3 is a diagram illustrating wireless devices in a wireless network.

FIG. 3 is a diagram 300 illustrating wireless devices in a wireless network (e.g., a WiFi network). An AP A 310 has a first transmission range 312 and manages a basic service set (BSS) A 311. The BSS A 311 includes the AP A 310, the STA A 332, the STA B 334, the STA C 336, the STA E 338, and the STA F 339. The AP B 320 has a second transmission range 322 and manages a BSS B 321. The BSS B 321 includes the AP B 320, the STA D 342, and the STA G 346. The BSS A 311 and the BSS B 321 overlap with each other and are considered as overlapping BSS (OBSS) to each other. The techniques described infra of instructing a set of or all of the STAs in a BSS to enable an RTS/CTS procedure base on an interference metric may improve network performance of the BSS. Further, when two or more BSSs overlap with each other, the service areas covered by both BSSs may be considered as areas having dense networks. For example, in an area having dense networks, a STA of a particular BSS (or network) may receive packets transmitted by STA(s) of an OBSS (or network). The techniques described infra of instructing a set of or all of the STAs in a BSS to enable an RTS/CTS procedure base on an interference metric may particularly improve network performance of dense networks.

In this example, a physical hidden node issue may exist. Particularly, the STA A 332 and the STA B 334 may be outside the transmission ranges of each other. Thus, when the STA A 332 transmits data packets to the AP A 310, the STA B 334 may not sense the data packets transmitted from the STA A 332. As a result, while the STA A 332 is transmitting, the STA B 334 does not withhold its data transmission and may start transmitting data to the AP A 310. Thus, data collision may exist at the AP A 310.

Further, in this example, an induced hidden node issue may also exist. Induced hidden nodes occur because of OBSS interference, which obscures a transmission from within the BSS of a STA. For example, the STA A 332 is within the transmission range of the AP B 320 and the STA C 336. When the AP B 320 is transmitting data packets to the STA D 342, the STA A 332 may also receives the data packets. The data transmission from the AP B 320 to the STA D 342 interferes with signal reception at the STA A 332. Because of such interference, when the STA C 336 transmits data packets to the AP A 310, the STA A 332 may miss or may not be able to detect the preamble of the data packets from the STA C 336.

Further, in this example, a simultaneous transmission issue may exist. Particularly, the STA A 332 may start transmitting data packets to the AP A 310 at the same time as the STA C 336, when the STA A 332 detects that the energy level of signals from the STA C 336 is below a clear channel assessment (CCA) energy detection (ED) threshold of the STA A 332. Data collision at the AP A 310 may prevent the AP A 310 from successfully receiving the data packets from the STA A 332 and the STA C 336. The transmit opportunities used by the STA A 332 and the STA C 336 to transmit the data packets, however, may be a substantial amount of time and may be consequently wasted. As will be described infra in detail, to address these issues, the AP A 310 may be configured to instruct a set of or all of the STAs in the BSS A 311 to enable the RTS/CTS procedure in a specified period of time base on an interference metric.

In one configuration, the STAs can use a technique that increases the minimum size of the contention window (CW min) to reduce in-BSS collisions. This technique, however, may have a drawback when there is an OBSS nearby. Further, this technique may not solve the physical hidden node/induced hidden node issues.

In another configuration, the STAs can use a technique based on CCA ED to reduce in-BSS collisions. In a WiFi network, wireless devices such as APs (and STAs) may perform a clear channel assessment (CCA) to determine whether a transmission channel is busy or idle for purposes of determining whether data may be transmitted to another wireless device.

A CCA has two components: carriers sense (CS) and ED. Carrier sense refers to an ability of a wireless device (e.g., AP or STA) to detect and decode incoming WiFi signal preambles of data packets from other wireless devices. For example, the AP A 310 may broadcast a WiFi signal preamble, and the WiFi signal preamble may be detected by the AP B 320. Similarly, the AP B 320 may broadcast a WiFi signal preamble, and the WiFi signal preamble may be detected by the AP A 310. When the AP A 310 detects one or more of the WiFi signal preambles, the AP A 310 may determine that the transmission channel is busy and not transmit data. The carrier may remain busy for the length of a transmission a data packet associated with the WiFi signal preambles.

The second component of CCA is energy detection, which refers to the ability of a wireless device to detect an energy level present on a transmission channel. The energy level may be based on different interference sources, WiFi transmissions, a noise floor, and/or ambient energy. WiFi transmissions may include unidentifiable WiFi transmissions that have been corrupted or are so weak that the transmission can no longer be decoded. Unlike carrier sense, in which the exact length of time for which a transmission channel is busy may be known, energy detection uses periodic sampling of a transmission channel to determine if the energy still exists. Additionally, energy detection requires at least one threshold used to determine whether the reported energy level is adequate to report the transmission channel as busy or idle. This energy level may be referred to as the ED threshold level or the CCA sensitivity level.

Using this technique, the CCA ED of the each STA can be set low enough such that the data transmission from any STA is above the CCA ED threshold of all other in-BSS STAs. In other words, the STAs within a BSS are configured to recognize data transmission of other STAs at a low energy level and yield to the data transmission of the other STAs. This technique, however, may not solve the simultaneous transmission/collision problem and may reduce overall reuse of the carrier.

As will be described infra in more detail, an RTS/CTS based technique may solve the physical/induced hidden node issue and the simultaneous transmission/collision issue. As will be explained, this technique may not reduce the overall network reuse. Particularly, the STAs and the APs can be configured to defer to only in-BSS RTSs/CTSs and to drop RTSs/CTSs from OBSSs. Particularly, the AP A 310 can be configured to request all the STAs in the BSS A 311 to enable the RTS/CTS procedure, and the request is based on one or more predetermined criteria.

In one configuration, the AP A 310 may decide to request all the STAs in the BSS A 311 to enable the RTS/CTS procedure (i.e., to use the RTS/CTS procedure to communicate data with the AP A 310) where the number of STAs in the BSS A 311 is above a certain number. After making this request, the AP A 310 can also choose to use the RTS/CTS procedure when the AP A 310 wants to send downlink data. Alternatively, the AP A 310 can determine to enable the RTS/CTS procedure if the number of STAs in a BSS with traffic above a certain threshold is above a certain number (i.e., if the number of active STAs in a BSS is above a certain number). For example, based on its experience and by monitoring the network, the AP A 310 can determine that if the number of STAs within the BSS A 311 is no less than a certain number (e.g., five), the hidden node issue and the simultaneous transmission issue described supra are likely to arise. As another example, based on its experience and by monitoring the network, the AP A 310 can determine that if the number of STAs having an active uplink is no less than a certain number (e.g., two), the hidden node issue and the simultaneous transmission issue described supra are likely to arise.

In one configuration, the AP A 310 may decide to request all the STAs in the BSS A 311 to enable the RTS/CTS procedure where the CCA ED threshold(s) being used by the device(s) in the BSS A 311 is(are) above a certain value (e.g., −62 dBm). In another configuration, each of the STAs in the BSS A 311 can be configured to enable the RTS/CTS procedure if the ED threshold of the STA is set to be above a certain value (e.g., −62 dBm). For example, in the BSS B 321, the AP B 320 may be communicating data with STA D 342. The STA E 338 can also receive the data transmission between the AP B 320 and the STA D 342. When the CCA ED threshold is set to be relatively high, the data transmission between the AP B 320 and the STA D 342 received at the STA E 338 may be under the CCA ED threshold. Accordingly, the STA E 338 may determine that the carrier is free. On the other hand, because the STA A 332 may be closer to the AP A 310 and the STA D 342, the data transmission between the AP B 320 and the STA D 342 received at the STA A 332 may be strong and may interfere with signal detection at the STA A 332. Therefore, during the data transmission between the AP B 320 and the STA D 342, the STA E 338 may consider the carrier as free based on the CCA ED threshold and transmits data packets to the AP A 310. Because the data transmission between the AP B 320 and the STA D 342 interferes with data reception at the STA A 332, the STA A 332 may not be able to detect preamble of the data packets and may not defer to the data transmission from the STA E 338 to the AP A 310. In other words, an induced hidden node issue may arise. To address this issue, the AP A 310 may request all the STAs in the BSS A 311 to enable the RTS/CTS procedure.

In one configuration, the AP A 310 may decide to request all the STAs in the BSS A 311 to enable the RTS/CTS procedure when the devices in the BSS A 311 are using transmission rules that data packets from OBSSs (e.g., the BSS B 321) are not being deferred to. For example, when the AP B 320 and the STA D 342 are communicating data, if the STA E 338 and the AP A 310 do not defer to the data transmission between the AP B 320 and the STA D 342, and start another data transmission, there may be more simultaneous transmissions in the network and the induced hidden node issue may arise with respect to the STA A 332. To address this issue, the AP A 310 may be configured to determine whether the STAs in the BSS A 311 are requested to defer to data packets from OBSSs such as the BSS B 321. The AP A 310 itself may have indicated to the STAs in the BSS A 311 not to defer to data packets from OBSSs unless the energy level of the data packets is above a certain level. Upon determining that one or more STAs in the BSS A 311 do not defer to data packets from OBSSs, the AP A 310 can request all the STAs in the BSS A 311 to enable the RTS/CTS procedure.

In one configuration, the AP A 310 may decide to request all the STAs in the BSS A 311 to enable the RTS/CTS procedure where the distance from the AP A 310 to the farthest STA is above a certain value. For example, the AP A 310 may be configured to determine or obtain the distance from each of the STAs in the BSS A 311 (i.e., the STA A 332, the STA B 334, the STA C 336, the STA E 338, and the STA F 339). The AP A 310 may determine that the distance from the STA B 334 to the AP A 310 is the farthest. The AP A 310 may be configured to request all the STAs in the BSS A 311 to enable the RTS/CTS procedure upon determining that the distance from the STA B 334 to the AP A 310 is greater than a predetermined value. The STA B 334 may be outside the transmission range of the other STAs (e.g., the STA A 332 and the STA E 338) in the BSS A 311 and may be a physical hidden node to the other STAs.

In another configuration, the AP A 310 may be configured to determine the signal strength from the farthest STA and to request all the STAs in the BSS A 311 to enable the RTS/CTS procedure upon determining that the signal strength is in a first predetermined relationship with a predetermined threshold. In this example, the AP A 310 may be configured to determine the received signal strength indication (RSSI) of the signals received from the STA B 334 (i.e., the farthest STA) and request all the STAs in the BSS A 311 to enable the RTS/CTS procedure if the RSSI is below a certain value. These measurements of RSSI can be done on data packets or management frames, or any other frame coming from the STAs. The AP 310 may request the transmission of any of these frames.

In one configuration, the AP A 310 may be configured to request all the STAs in the BSS A 311 to enable the RTS/CTS procedure, if the distance from the nearest AP on the same channel is closer that a certain threshold. In this example, the AP A 310 may determine that the nearest AP on the same channel is the AP B 320. The AP A 310 may be further configured to determine or to obtain the distance from the AP B 320 to the AP A 310. Because the AP B 320 operates on the same channel and is close to the AP A 310, the AP B 320 may cause the induced hidden node issue in the BSS A 311. Thus, upon determining that the distance is below a predetermined value, the AP A 310 may decide to request all the STAs in the BSS A 311 to enable the RTS/CTS procedure.

In another configuration, the AP A 310 may be configured to determine the signal strength from the nearest AP and to request all the STAs in the BSS A 311 to enable the RTS/CTS procedure upon determining that the signal strength is above a predetermined threshold. In this example, the AP A 310 may be configured to determine the RSSI of the signals received from the AP B 320 (i.e., the nearest AP) and request all the STAs in the BSS A 311 to enable the RTS/CTS procedure if the RSSI is above a certain value.

In another configuration, the AP A 310 may be configured to request all the STAs in the BSS A 311 to enable the RTS/CTS procedure if a BSS distance, or an effective distance, to other OBSSs (e.g., BSS B 320) is below a certain threshold. The BSS distance may be some metric, such as a ratio, which conveys information about the relatively distance of the STAs in a BSS as compared to the distance to neighboring BSSs which operate on the same channel as the BSS.

There may be any number of possible ways of calculating the distance between two BSSs, in order to determine the proximity of OBSSs. The simplest method of doing this may be to simply measure the distance between two APs 310 and 320. However, this may be insufficient. As illustrated in FIG. 3, the APs 310 and 320 may be some distance from each other. However, their BSSs may still be contiguous because that the STA A 332 and the STA G 346 are close to one another. Due to the proximity of STA A 332 and STA G 346, transmissions to or from one of these devices may be interrupted by transmission to or from the other device. This proximity may be missed if a BSS distance is measured solely by determining a distance between two APs. Accordingly, it may be desirable to have more nuanced and sophisticated measures of BSS distance. These more sophisticated BSS distance measures may provide better information of how far apart the STAs in one BSS are from the STAs in another BSS.

For example, BSS distance may be defined in a number of ways. Note that each of these options may be mixed and matched to some extent. For example, certain measures may use averages, or may use values for a furthest STA. All options may use received signal strength measurements (e.g., RSSI) instead of distance measurements, though the formulas do have to be adjusted when RSSI is used instead of distance. Any of these options may be used interchangeably, by changing the metric in a suitable manner.

A first option for calculating a BSS distance may be to calculate the distance from the AP in a BSS to the nearest OBSS AP that operates on the same channel, divided by the distance from the AP in the BSS to the furthest STA in the BSS. Another option for calculating a BSS distance may be to take an average (or expected value) for each STA in a BSS of the distance from that STA to the nearest neighboring OBSS AP, divided by the distance from the STA to the AP of its own BSS. Another option for calculating a BSS distance may be to take the distance between station x and its nearest neighboring OBSS AP, divided by the distance from station x and the BSS AP that it is associated with, where station x is the STA in the BSS which is further from the AP.

Another method of calculating BSS distance may be based, at least in part, on the BSS distance to a particular OBSS. To get a final BSS distance, these OBSS distances can be averaged, or the minimum value can be taken. As another example, the BSS distance of BSS A 311 may be based on the distance between the AP 310 and its nearest neighboring OBSS AP in the same channel, such as the AP 320. For example, a BSS distance may be calculated based on the distance from an AP to its nearest neighboring same-channel OBSS AP, divided by the mean distance between the AP and all STAs in that APs BSS. In some aspects, a number of different BSS distances may be calculated in this manner, for each of a number of different neighboring access points. As mentioned previously, to get a final BSS distance, these BSS distances per OBSS can be averaged, or the minimum value can be taken. In some aspects, the denominator of this BSS distance may also be, for example, the distance to the furthest-away STA in the BSS, the median distance between the AP and a STA in the BSS, or another metric.

In some aspects, the distance between an AP and a STA, or an AP and another AP, may be approximated using RSSI values. RSSI is a measurement of the power present in a received radio signal, and distance between two wireless devices may be inferred based upon this metric. For example, a received signal strength may be compared to a transmitter signal strength of that device (which may be known), in order to estimate a distance to a device based on the RSSI. Further, the RSSI value itself may be used directly in the above calculations, provided that the calculations are modified in order to accommodate the use of an RSSI value. For example, the first option for calculating distance may be modified to use an RSSI value by calculating BSS distance as the RSSI (from the AP in the BSS) to the farthest STA in the BSS, divided by the RSSI (from the AP in the BSS) to the nearest OBSS AP on the same channel. Note that when using an RSSI value rather than a distance, it may be advantageous to switch the numerator and the denominator from the distance-based ratios above. This is because, generally, an RSSI may be inversely-related to a distance between two wireless devices. Accordingly, it may be beneficial to switch the numerator and denominator when using RSSI values rather than distances.

In one configuration, the AP A 310 can be configured to use a new information element (IE) that indicates all STAs within the BSS A 311 should turn RTS/CTS on or off. The IE may be broadcasted in a management frame, or in a beacon. Upon receiving the IE, each of the STAs in the BSS A 311 may determine whether the RTS/CTS procedure is currently enabled. If the RTS/CTS procedure is not currently enabled, a STA can turn on the RTS/CTS procedure upon receiving the IE. The STA can leave the RTS/CTS procedure on until otherwise notified by a new IE. In one configuration, the IE can include one or more fields that specify whether a receiving STA is requested to enable or disable the RTS/CTS procedure.

Figure 4:
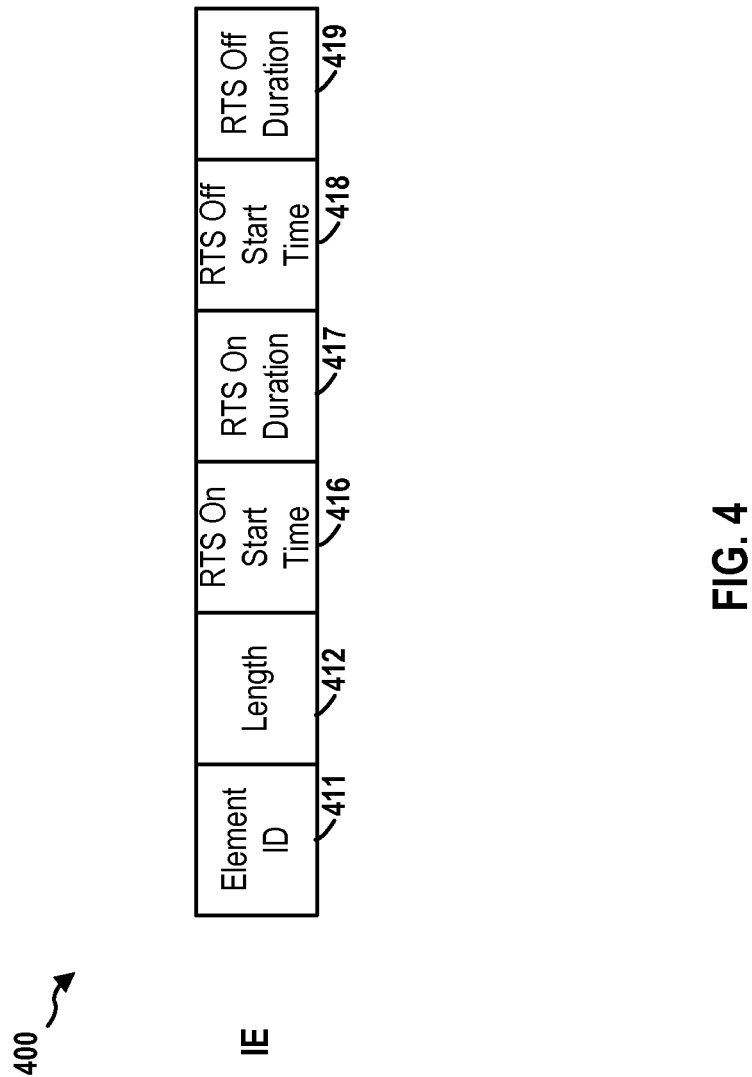
FIG. 4 is a diagram illustrating a format of an exemplary IE used for medium reserving procedure enablement in a BSS.

FIG. 4 is a diagram 400 illustrating a format of an exemplary IE used for medium reserving procedure enablement in a BSS. In one configuration, an RTS/CTS IE 410 has an element ID field 411, a length field 412, an RTS on start time field 416, an RTS on duration field 417, an RTS off start time field 418, and an RTS off duration field 419.

The element ID field 411 identifies the element such that a receiving station can distinguish the joint RTS/CTS IE 410 from other IEs. The length field 412 indicates the length of the joint RTS/CTS IE 410. The RTS on start time field 416 indicates a time at which the receiving station is requested to enable the RTS/CTS procedure, that is, to start using the RTS/CTS procedure to transmit data to the AP A 310. The RTS on duration field 417 indicates a time duration during which the receiving station is requested to enable the RTS/CTS procedure, that is, to continuously use the RTS/CTS procedure to transmit data to the AP A 310. The RTS off start time field 418 indicates a time at which the receiving station is requested to disable the RTS/CTS procedure, that is, to start transmitting data to the AP A 310 without using the RTS/CTS procedure. The RTS off duration field 419 indicates a time duration during which the receiving station is requested to disable the RTS/CTS procedure, that is, to continuously transmit data to the AP A 310 without using the RTS/CTS procedure.

Each of the length field 412, the RTS on start time field 416, the RTS on duration field 417, the RTS off start time field 418, and the RTS off duration field 419 may be optional. Particularly, in one configuration, the IE 410 does not have any of the fields indicating start times or durations. The IE 410 may simply have a bit which indicates STAs to either turn ON RTS/CTS or turn OFF RTS/CTS. In another configuration, the IE 410 does not have a length field.

In one configuration, the AP A 310 can be configured to include the IE in a beacon frame and use beacon frame to request the STAs in the BSS A 311 to turn on or off the RTS/CTS procedure. Each of the STAs in the BSS A 311 can be configured to enable the RTS/CTS procedure for a predetermined number of beacon intervals upon receiving a beacon frame having the IE. Alternatively, the AP A 310 can configure the IE to instruct the receiving STAs to enable the RTS/CTS procedure until the receiving STAs receives another beacon frame including an IE that instructs the receiving STAs to disable the RTS/CTS procedure. Each of the STAs in the BSS A 311 are accordingly configured to enable and disable the RTS/CTS procedure as instructed by the IE carried in beacon frames.

In one configuration, additional techniques can be implemented at the STAs to maintain network reuse while the RTS/CTS procedure is enabled. For example, one or more techniques as described infra can be implemented to allow a STA from each of the BSS A 311 and the BSS B 321 to simultaneously transmit data packets to the AP A 310 and the AP B 320, respectively. The STA D 342 and the AP B 320 may use the RTS/CTS procedure to transmit data packets to each other. The RTSs/CTSs sent by the STA D 342 and the AP B 320 may be received at the STA A 332, the STA E 338, and the AP A 310. In this configuration, the AP A 310 and the STAs in the BSS A 311 are configured to ignore (i.e., not withhold data transmission) an RTS/CTS if it comes from OBSSs as long as the energy of the RTS/CTS is below an ED threshold. (In contrast, in some other configurations, the STA A 332, the STA E 338, and the AP A 310 may be configured to withhold data transmission upon receiving RTSs/CTSs from the BSS B 321.)

In one configuration, the STAs and the APs in the BSS A 311 and the BSS B 321 can be configured to add BSS information in the preamble (e.g., in the AID field) of an RTS/CTS packet. Accordingly, the STAs and the APs in the BSS A 311 and BSS B 321 can determine whether an RTS/CTS packet is from an OBSS. For example, the AP B 320 can add the BSS ID of the BSS B 321 in the preamble of an RTS/CTS packet sent to the STA D 342. If the STA A 332, the STA E 338, and/or of the AP A 310 receive the RTS/CTS data packet, after decoding the preamble, the STA A 332, the STA E 338, and/or of the AP A 310 can determine that the RTS/CTS packet is from the BSS B 321 and, accordingly, can ignore the RTS/CTS packet.

In one configuration, the BSS information may not be added in the preamble. Nonetheless, for an uplink RTS/CTS packet, the STAs and the APs can still determine whether the uplink RTS/CTS packet is an OBSS packet.

For a downlink RTS/CTS packet, if a STA can only decode the preamble but not the data field, the STA does not know that the packet is an RTS/CTS packet and only defers for the duration of the actual transmission time period of the RTS/CTS packet.

If a STA can decode the data field of the packet, then the STA can determine whether the data packet is an RTS/CTS packet from an OBSS. If the data packet is an RTS/CTS packet from an OBSS, the STA can choose not to defer to the forthcoming data packet(s).

In one configuration, the STA A 332 and the STA E 338 of the BSS A 311 as well as the STA G 346 of the BSS B 321 may be second-generation or later generation (e.g., a next generation WiFi standard compatible) devices. The STA C 336 of the BSS A 311 and the STA D 342 of the BSS B 321 may be first-generation or legacy (e.g., IEEE 802.11a) devices. The second-generation devices may be capable of handling (e.g., may not be interfered by) simultaneous OBSS data transmissions, while the first-generation devices may not be capable. The terms first-generation and a second-generation used here are relative terms.

A second-generation device may be configured to defer to the first-generation RTSs/CTSs sent by the first-generation devices in an OBSS. In this example, the STA D 342 may send a first-generation RTS/CTS to the AP B 320. The first-generation RTS/CTS may be received at the STA A 332 and the STA E 338. The STA A 332 and the STA E 338 may be configured to determine whether the RTS/CTS is sent from a first-generation device based on, for example, the format of the first-generation RTS/CTS. In this example, the STA A 332 and the STA E 338 determines that the first-generation RTS/CTS is sent from a first-generation device. Accordingly, the STA A 332 and the STA E 338 may choose to defer to the first-generation RTS/CTS and withhold data transmission during the duration specified in the first-generation RTS/CTS. Otherwise, the data transmission from the STA A 332 or the STA E 338 may interfere with the data transmission between the STA D 342 and the AP B 320.

In accordance with one technique, a second-generation device may be configured to transmit second-generation RTSs/CTSs that are decodable by second-generation devices but are not decodable by first-generation devices. In one example, the STA A 332, which is a second-generation device, may send a second-generation RTS/CTS to the AP A 310. The STA C 336, which is a first-generation device, may receive the second-generation RTS/CTS. The STA C 336, however, is not capable of decoding the second-generation RTS/CTS. Accordingly, the STA C 336 does not defer to the second-generation RTS/CTS. This may not be a desired behavior. The STA G 346 of the BSS B 321, which is a second-generation device, may also receive the second-generation RTS/CTS sent by the STA A 332. The STA G 346 can further determine that the second-generation RTS/CTS is from a second-generation device. Further, the STA G 346 may be configured to ignore RTSs/CTSs sent from second-generation devices in OBSSs. Accordingly, the STA G 346 may ignore the second-generation RTS/CTS received from the STA A 332 and may start data transmission during the duration specified in the modified first-generation RTS/CTS. This may be a desired behavior. The STA D 342 of the BSS B 321, which is a first-generation device, may also receive the second-generation RTS/CTS sent by the STA A 332. The STA D 342 is not capable of decoding a second-generation RTS/CTS and, consequently, does not defer to the second-generation RTS/CTS. This may be a desired behavior.

In accordance with another technique, a second-generation device may be configured to transmit a modified first-generation RTS/CTS that are decodable by first-generation devices and that are distinguishable as an RTS/CTS sent by a second-generation device. In one example, the STA A 332, which is a second-generation device, may send such a modified first-generation RTS/CTS 371 to the AP A 310. The STA C 336, which is a first-generation device, may receive the modified a first-generation RTS/CTS 371 and is able to decode the RTS/CTS. Accordingly, the STA C 336 defers to the RTS/CTS. This may be a desired behavior. The STA G 346 of the BSS B 321, which is a second-generation device, may also receive the modified first-generation RTS/CTS 371 sent by the STA A 332. The STA G 346 can further determine that the modified first-generation RTS/CTS 371 is from a second-generation device. Further, the STA G 346 may be configured to ignore RTSs/CTSs sent from second-generation devices in OBSSs. Accordingly, the STA G 346 may ignore the modified first-generation RTS/CTS 371 received from the STA A 332 and may start data transmission during the duration specified in the modified first-generation RTS/CTS. This may be a desired behavior.

In one example, a modified first-generation RTS/CTS is constructed by changing a bit in the frame control field of a first-generation RTS/CTS (e.g., IEEE 802.11a compatible RTS/CTS). The STA A 332, the STA E 338, and the STA G 346 can be configured to detect this bit in a modified first-generation RTS/CTS. Upon detecting this bit, the STA A 332, the STA E 338, and the STA G 346 can determine that the RTS/CTS is sent from a second-generation device. Further, because the modified first-generation RTS/CTS has the same format as that of the first-generation RTS/CTS, a first-generation device can decode the modified a first-generation RTS/CTS, although the first-generation device is not configured to detect the changed bit, i.e., the generation information bit.

Figure 5:
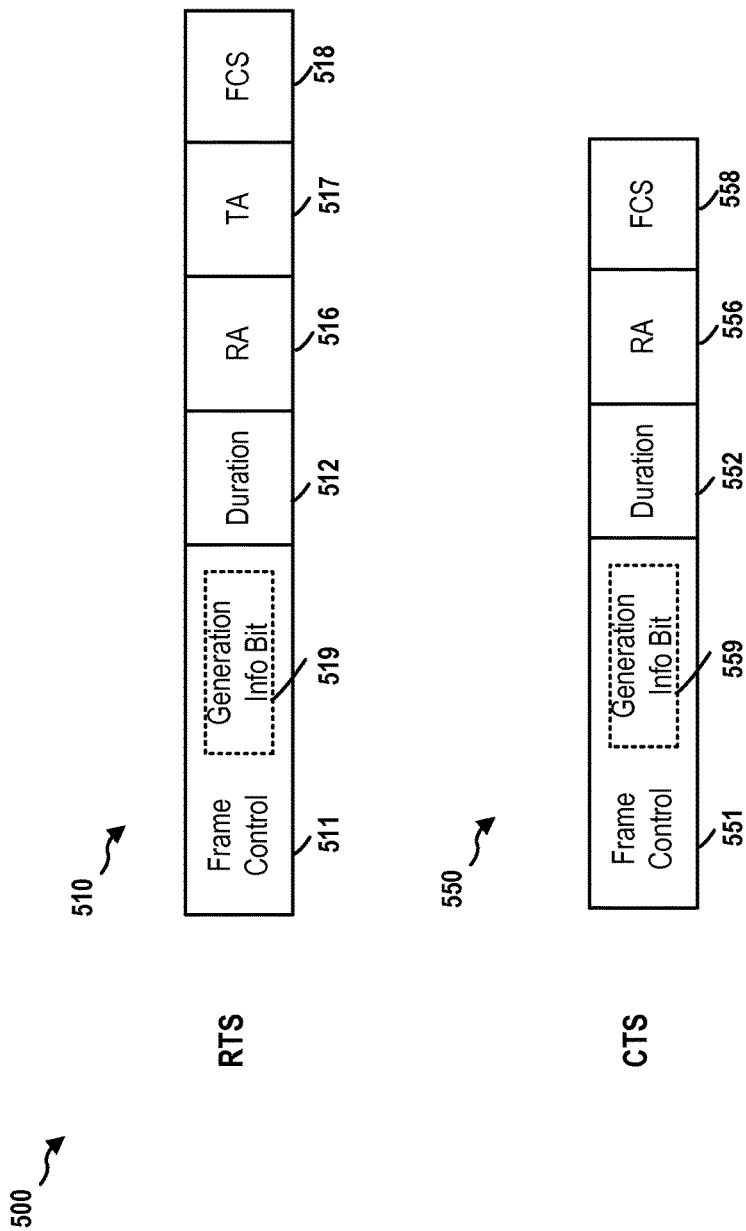
FIG. 5 is a diagram illustrating formats of modified Request-to-Send (RTS) and Clear-to-Send (CTS) frames.

FIG. 5 is a diagram 500 illustrating formats of modified first-generation RTS and CTS frames. A modified first-generation RTS frame 510 has a Frame Control field 511, a Duration field 512, an RA field 516, a TA field 517, and a Frame Check Sequence (FCS) field 518. The formats of these fields are compatible with the first-generation RTS frames (e.g., IEEE 802.11a RTS frames). The Frame Control field 511 includes frame control information. The RA field 516 is the address of the STA that is the intended recipient of the pending directed data or management frame. The TA field 517 is the address of the STA transmitting the RTS frame. The Duration field 512 is set to the duration in microseconds of the frame sequence including the expected CTS response and subsequent frame exchanges. The FCS field contains a 32-bit cyclic redundancy code (CRC) calculated over all the fields in the medium access control (MAC) header and the frame body. The FCS is used to validate the integrity of the MAC protocol data unit (MPDU). The modified first-generation RTS frame uses one bit in the frame control field as the generation info bit 519 to indicate that the sender of the modified first-generation RTS frame is a second-generation device. The possible bits in the Frame Control field 511 that can be used include one or more of the following: To DS and From DS bits, More Fragments bit, Retry Bit, Protected Frame Bit, and Order Bit.

A modified first-generation CTS frame 550 has a Frame Control field 551, a Duration field 552, an RA field 556, and a FCS field 558. The formats of these fields are compatible with the first-generation CTS frames (e.g., IEEE 802.11a CTS frames). The Frame Control field 551 includes frame control information. Similarly, the Frame Control field 551 may include generation info bit 559.

When the CTS frame 550 follows an RTS frame 510, the RA field 556 is copied from the TA field 517 of the RTS frame 510 that solicited the CTS frame 550. The Duration field in this case is the value obtained from the RTS frame 510 less the duration of a short inter frame space (SIFS) and less the duration of the CTS frame. When the CTS frame 550 is the first frame in a sequence (providing network allocation vector (NAV) protection to the subsequent frames in the sequence), then the RA field 556 is the transmit address of the sending STA. This is called CTS-to-Self. The Duration field in this case is set to the duration of the subsequent frame exchange in microseconds. The FCS field contains a 32-bit cyclic redundancy code (CRC) calculated over all the fields in the medium access control (MAC) header and the frame body. The FCS is used to validate the integrity of the MAC protocol data unit (MPDU). The modified first-generation CTS frame uses one bit in the frame control field as the generation info bit 559 to indicate that the sender of the modified first-generation CTS frame is a second-generation device. The possible bits in the Frame Control field 551 that can be used include one or more of the following: To DS and From DS bits, More Fragments bit, Retry Bit, Protected Frame Bit, and Order Bit.

Figure 6:
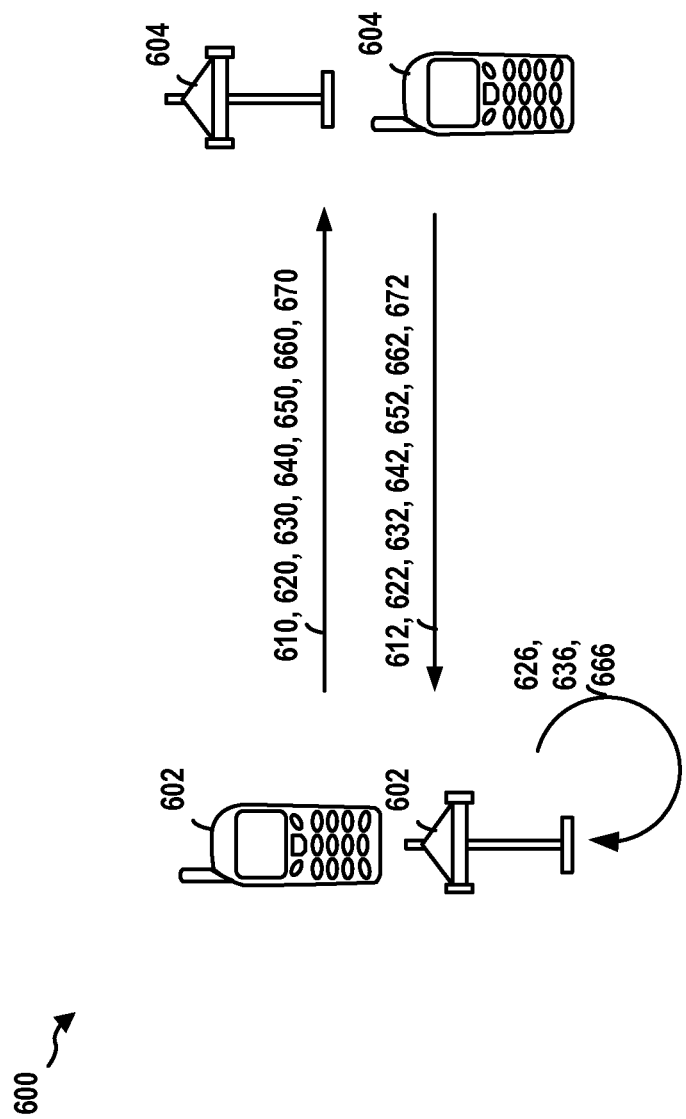
FIG. 6 is a diagram illustrating signal communication between an RTS transmitter and an RTS receiver in a wireless network.

FIG. 6 is a diagram 600 illustrating signal communication between an RTS transmitter and an RTS receiver in a wireless network (e.g., a WiFi network). An RTS transmitter 602 is in data communication with an RTS receiver 604. The RTS transmitter 602 may be a STA or an AP. Correspondingly, the RTS receiver 604 may be an AP or a STA.

In configuration 1, the RTS transmitter 602 and the RTS receiver 604 uses the RTS/CTS procedure to transmit data packets. At operation 610, the RTS transmitter 602 transmits an RTS to the RTS receiver 604. If the RTS receiver 604 is allowed to transmit, at operation 612, the RTS receiver 604 sends a CTS back to the RTS transmitter 602. The presence of a CTS only indicates that the MCS used to transmit the RTS was able to be received and decoded at the RTS receiver 604.

In one technique, the RTS/CTS procedure can be used both as a sounding mechanism as well as a silencing mechanism. In a broader sense, upon receiving an RTS from the RTS transmitter 602, the RTS receiver 604 can use a CTS to inform the RTS transmitter 602 whether the RTS receiver 604 can support desired transmissions. Further, the RTS transmitter 602 and the RTS receiver 604 can use the RTS/CTS procedure to silence other devices to avoid interference with the desired transmission.

In configuration 2, at operation 620, the RTS transmitter 602 sends an RTS at a desired transmission MCS. For example, the RTS transmitter 602 may send the RTS based on MCS 5. If the RTS receiver 604 supports the desired MCS of the RTS transmitter 602 (i.e., MCS 5), the RTS receiver 604 can decode the RTS. In response, at operation 622, the RTS receiver 604 sends to the RTS transmitter 602 a CTS based on MCS 0 (not based on MCS 5). The CTS sent based on MCS 0 can be decoded by all the devices in a BSS. Sending the CTS based on MCS 0 may silence more devices. If the RTS receiver 604 does not support the desired MCS of the RTS transmitter 602, the RTS receiver 604 cannot decode RTS and does not send back a CTS. Upon receiving the CTS from the RTS receiver 604, optionally at operation 626, the RTS transmitter 602 can send a CTS-to-Self based on MCS 0 to silence devices around the RTS transmitter 602. Alternatively, operation 626 can be executed prior to operation 620. Operation 626 may be omitted if the RTS transmitter 602 is a STA and the RTS receiver 604 is an AP, as the MCS 0 CTS from the AP can reach the entire BSS.

In configuration 3, at operation 630, the RTS transmitter 602 sends an RTS at a desired transmission MCS. For example, the RTS transmitter 602 may send the RTS based on MCS 5. If the RTS receiver 604 supports the MCS 5, at operation 632, the RTS receiver 604 sends a CTS based on MCS 5. This gives the best information about whether the desired transmission MCS is supportable at the RTS receiver 604. Upon receiving the CTS from the RTS receiver 604, optionally at operation 636, the RTS transmitter 602 can send a CTS-to-Self based on MCS 0 to silence devices around the RTS transmitter 602. Operation 636 can also be executed prior to operation 630.

Figure 7:
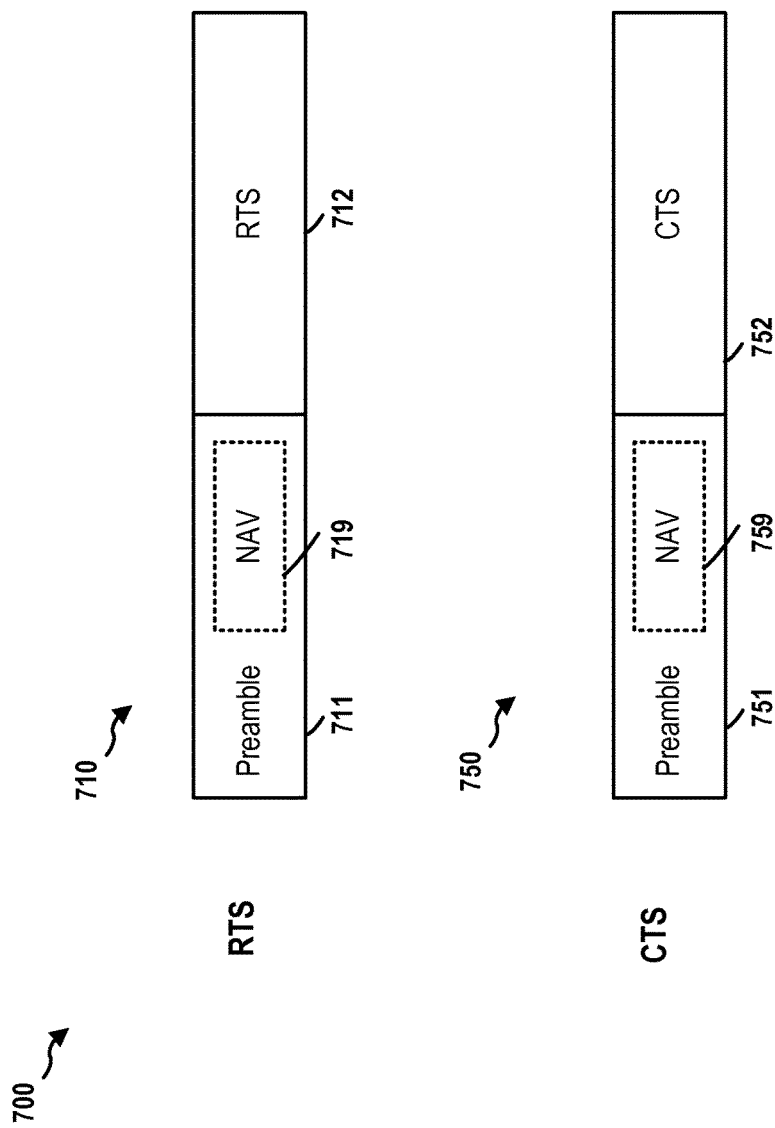
FIG. 7 is a diagram illustrating formats of RTS and CTS packets.

In configuration 4, at operation 640, the RTS transmitter 602 sends an RTS with NAV included in the preamble of the RTS at a desired transmission MCS. FIG. 7 is a diagram 700 illustrating formats of RTS and CTS packets. As shown, an RTS packet 710 includes a preamble 711 and an RTS frame 712. Further, the preamble 711 includes a NAV 719. For example, the RTS transmitter 602 may send the RTS packet 710 with the NAV based on MCS 5. If the RTS receiver 604 supports the MCS 5, at operation 642, the RTS receiver 604 sends a CTS with a NAV included in the preamble of the CTS based on MCS 5. As shown in FIG. 7, a CTS packet 750 includes a preamble 751 and a CTS frame 752. Further, the preamble 751 includes a NAV 759. The neighboring nodes of the RTS transmitter 602 and the RTS receiver 604, even if not supporting the desired MCS, may be able to decode the preamble of the RTS and may be configured to detect the NAV included in the preamble. Accordingly, the neighboring nodes may be silenced by this technique.

In configuration 5, at operation 650, the RTS transmitter 602 sends a modified RTS based on MCS 0. The modified RTS includes information indicating the desired MCS of the RTS transmitter 602. For example, the modified RTS may indicate that the RTS transmitter 602 requests MCS 5. If the RTS receiver 604 supports MCS 5, at operation 652, the RTS receiver 604 may send a CTS based on MCS 0, indicating that the RTS receiver 604 supports the desired MCS of the RTS transmitter 602. Alternatively, at operation 652, the RTS receiver 604 may send a modified CTS to the RTS transmitter 602 based on MCS 0. The modified CTS includes information indicating the supported MCS of the RTS receiver 604 (e.g., MCS 3). If the RTS receiver 604 does not support MCS 5, the RTS receiver 604 does not transmit a CTS back to the RTS transmitter 602.

Figure 8:
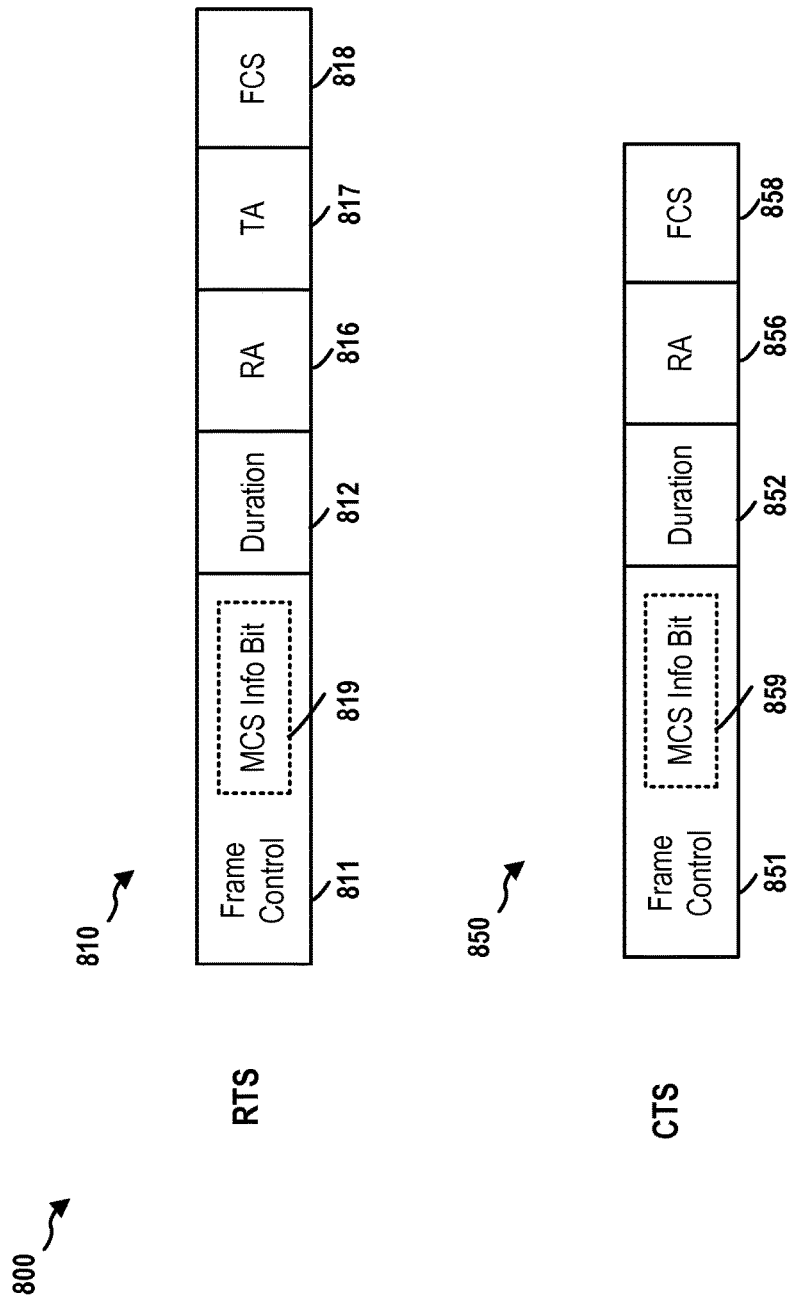
FIG. 8 is a diagram illustrating formats of modified RTS and CTS frames used as a sounding mechanism.

FIG. 8 is a diagram 800 illustrating formats of modified RTS and CTS frames used as a sounding mechanism. A modified RTS frame 810 has a Frame Control field 811, a Duration field 812, an RA field 816, a TA field 817, and a FCS field 818. The formats of these fields are compatible with the RTS frames (e.g., IEEE 802.11a RTS frames). The Frame Control field 811 includes frame control information. The RA field 816 is the address of the STA that is the intended recipient of the pending directed data or management frame. The TA field 817 is the address of the STA transmitting the RTS frame. The Duration field 812 is set to the duration in microseconds of the frame sequence including the expected CTS response and subsequent frame exchanges. The FCS field contains a 32-bit CRC calculated over all the fields in the MAC header and the frame body. The FCS is used to validate the integrity of the MPDU. The modified RTS frame may use one or more bits in the frame control field as the MCS information bits 819 to indicate an MCS. The possible bits in the Frame Control field 811 that can be used include one or more of the following: To DS and From DS bits, More Fragments bit, Retry Bit, Protected Frame Bit, and Order Bit.

A modified CTS frame 850 has a Frame Control field 851, a Duration field 852, an RA field 856, and a FCS field 858. The formats of these fields are compatible with the CTS frames (e.g., IEEE 802.11a CTS frames). The Frame Control field 851 includes frame control information. Similarly, the Frame Control field 851 may include MCS information bits 859.

In configuration 6, at operation 660, the RTS transmitter 602 sends an RTS at a desired transmission MCS. For example, the RTS transmitter 602 may send the RTS based on MCS 5. If the RTS receiver 604 can decode the RTS, at operation 662, the RTS receiver 604 may send a CTS at an MCS that the RTS receiver 604 can support or desire to use (e.g., MCS 3). If the RTS receiver 604 does not support MCS 5, the RTS receiver 604 does not transmit a CTS back to the RTS transmitter 602. Upon receiving the CTS from the RTS receiver 604, at operation 666, the RTS transmitter 602 can send a CTS-to-Self based on MCS 0 to silence devices around the RTS transmitter 602. Alternatively, operation 666 can be executed prior to operation 660.

In configuration 7, at operation 670, the RTS transmitter 602 sends an RTS based on MCS 0. At operation 672, the RTS receiver 604 sends a CTS at an MCS that the RTS receiver 604 can handle at best (e.g., MCS 3).

Any of the above configurations can be selected and combined to arrive at a new configuration. The choice of configurations may depend on whether the RTS transmitter 602 is an AP or a STA. For example, if RTS transmitter 602 is a STA, the RTS transmitter 602 and the RTS receiver 604 can be configured in accordance with configuration 2 without operation 626. Operations 620 and 622 can silence the entire BSS. If the RTS transmitter 602 is an AP, the RTS transmitter 602 and the RTS receiver 604 can be configured in accordance with configuration 2 with operation 626. Alternatively, the RTS transmitter 602 and the RTS receiver 604 can be configured in accordance with configuration 3 with an extra CTS-to-Self. Alternatively, the RTS transmitter 602 and the RTS receiver 604 can be configured in accordance with configuration 5, 6, or 7.

Figure 9:
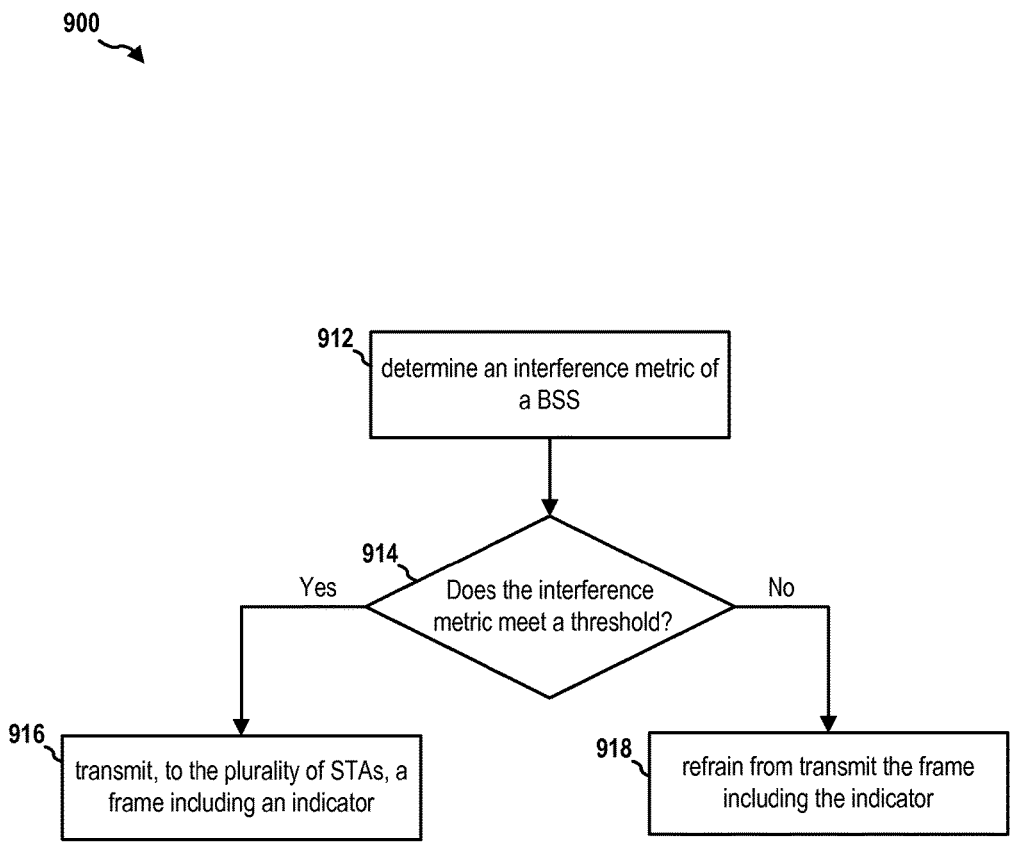
FIG. 9 is a flow chart of an exemplary method of enabling a medium reserving procedure in a BSS.

FIG. 9 is a flow chart of an exemplary method 900 of enabling a medium reserving procedure in a BSS. The method may be performed by an AP (e.g., the access point 104, the AP A 310, the AP B 320, the apparatus 1202/202). The AP operates in a BSS having a plurality of STAs. At operation 912, the AP determines an interference metric of the BSS. The interference metric indicates a degree of interference in the BSS caused by one or more hidden nodes associated with the plurality of STAs. For example, referring to FIG. 3, the AP A 310 may determine an interference metric of the BSS A 311. The interference metric may be a CCA ED threshold.

At operation 914, the AP determines whether the interference metric meets a threshold. When the interference metric meets a threshold, the AP, at operation 916, transmits, to the plurality of STAs, a frame including an indicator when the interference metric meets a threshold. The indicator indicates to each of the plurality of STAs to enable a medium reserving procedure. The medium reserving procedure reserves a medium for data transmission. When the interference metric does not meet the threshold, the AP, at operation 918, refrains from transmitting the frame including the indicator. In certain configurations, the interference metric includes a CCA energy detection ED threshold of the BSS. The interference metric is determined to meet the threshold when the CCA ED threshold is greater than the threshold. In certain configurations, the AP may increase a minimum size of a contention window when the CCA ED threshold is greater than the threshold. For example, referring to FIG. 3, when the CCA ED thresholds being used by the devices in the BSS A 311 are above a certain value (e.g., −62 dBm), the AP A 310 may decide to request all the STAs in the BSS A 311 to enable the RTS/CTS procedure.

In certain configurations, the medium reserving procedure employs an RTS/CTS procedure. In certain configurations, the interference metric includes a number of STAs in the plurality of STAs. The interference metric is determined to meet the threshold when the number is greater than the threshold. In certain configurations, the interference metric includes a number of STAs of the plurality of STAs that have active uplink traffic. The interference metric is determined to meet the threshold when the number is greater than the threshold. In certain configurations, the interference metric includes a configuration of the plurality of STAs for deferring to data packets from an OBSS. The interference metric is determined to meet the threshold when the configuration indicates that the plurality of STAs do not defer to the data packets from the OBSS. In certain configurations, the interference metric includes a distance of a STA of the plurality of STAs that is the farthest from the AP. The interference metric is determined to meet the threshold when the distance is greater than the threshold. In certain configurations, the interference metric includes strength of a signal received from a STA of the plurality of STAs that is the farthest from the AP. The interference metric is determined to meet the threshold when the strength is less than the threshold.

In certain configurations, the interference metric includes a distance of another AP that is the nearest from the AP. The interference metric is determined to meet the threshold when the distance is less than the threshold. In certain configurations, the interference metric includes strength of a signal received from another AP that is the nearest from the AP. The interference metric is determined to meet the threshold when the strength is greater than the threshold. In certain configurations, the interference metric includes an effective distance of the BSS with respect to an OBSS. The effective distance is a predetermined function of relative distances among at least one STA of the BSS, the AP, an AP of the OBSS, and at least one STA of the OBSS. The interference metric is determined to meet the threshold when the effective distance is less than the threshold. In certain configurations, the frame is a management frame or in a beacon frame. The indicator is included in an IE of the frame.

Figure 10:
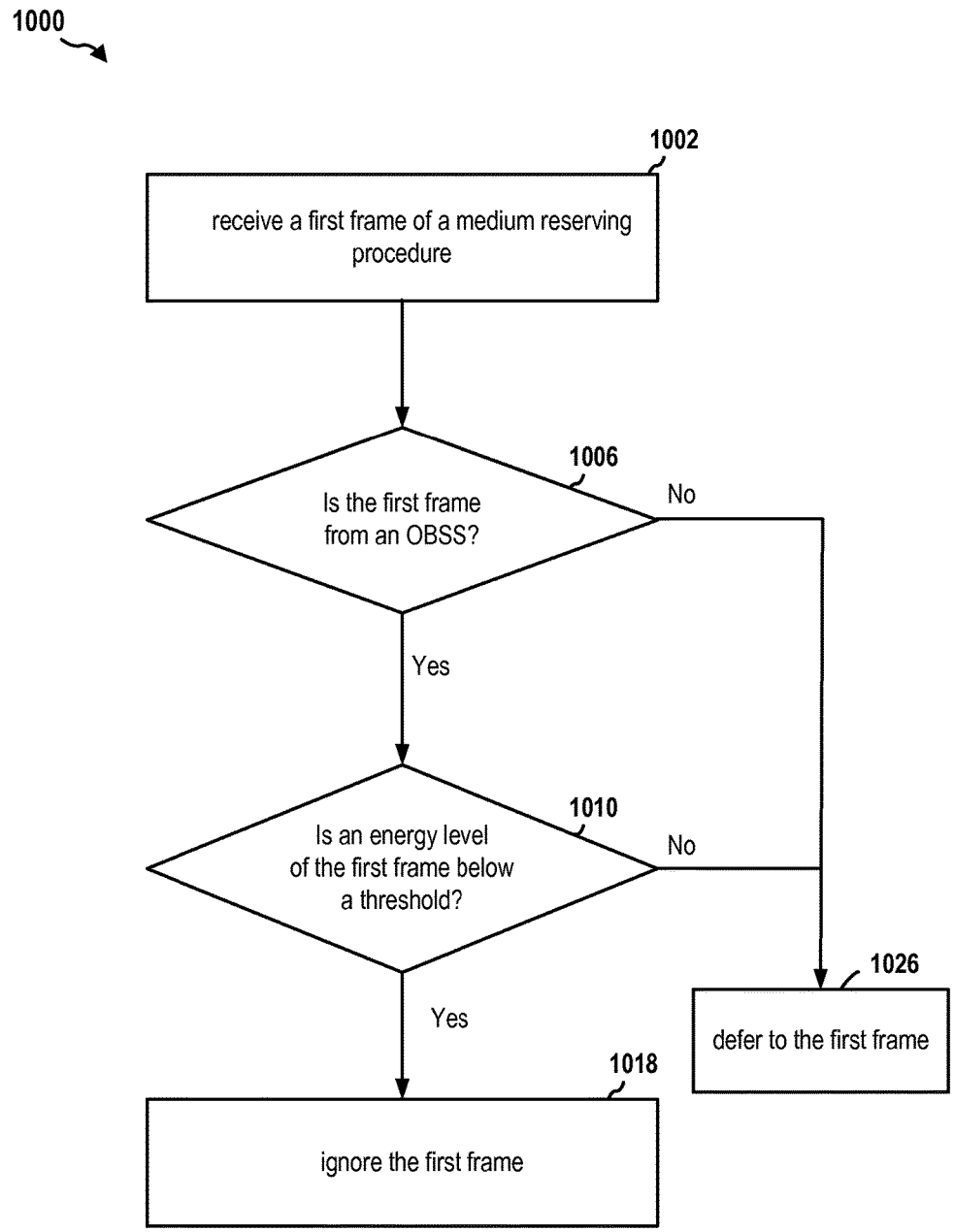
FIG. 10 is a flow chart of an exemplary method of wireless communication for determining whether to defer to a medium reserving procedure frame.

FIG. 10 is a flow chart of an exemplary method 1000 of wireless communication for determining whether to defer to a medium reserving procedure frame (e.g., RTS/CTS). The method may be performed by a STA (e.g., the STA A 332, the STA B 334, the wireless device 202, the apparatus 1202, the apparatus 1302). At operation 1002, the STA receives a first frame of a medium reserving procedure. The medium reserving procedure reserves a medium for data transmission. At operation 1006, the STA determines whether the frame is from an OBSS. If the first frame is not from an OBSS, the STA defers to the first frame at operation 1026. If the first frame is from an OBSS, at operation 1010, the STA determines whether an energy level of the frame is in a first predetermined relationship with a predetermined threshold. If the energy level of the first frame is not in the first predetermined relationship with the predetermined threshold, at operation 1018, the STA enters operation 1026 and defer to the first frame. If the energy level of the first frame is in the first predetermined relationship with the predetermined threshold, the STA ignores the first frame. In one configuration, the first predetermined relationship defines that the energy level is below the predetermined threshold.

For example, referring to FIG. 3, the STA D 342 and the AP B 320 may use the RTS/CTS procedure to transmit data packets to each other. The RTSs/CTSs sent by the STA D 342 and the AP B 320 may be received at the STA A 332, the STA E 338, and the AP A 310. In this configuration, the AP A 310 and the STAs in the BSS A 311 are configured to ignore (i.e., not withhold data transmission) an RTS/CTS if it comes from OBSSs as long as the energy of the RTS/CTS is below an ED threshold.

In one configuration, to determining whether the first frame is from an OBSS, the STA detects a BSS indication in a preamble of the first frame. In one configuration, the STA is a second-generation device. The STA ignores a second frame of the medium reserving procedure sent from another second-generation device in an OBSS. The STA defers to a third frame of the medium reserving procedure sent from another second-generation device in the BSS. The STA defers to a fourth frame of the medium reserving procedure sent from a first-generation device. The first, second, third, and fourth frames are decodable by a first generation device. The first generation device defers to the first, second, third, and fourth frames. The STA determines whether the first frame is sent from a first generation device or a second-generation device based on an information unit in the frame. The STA ignores the first frame further in response to determining that the first frame is from a second-generation device.

Figure 11:
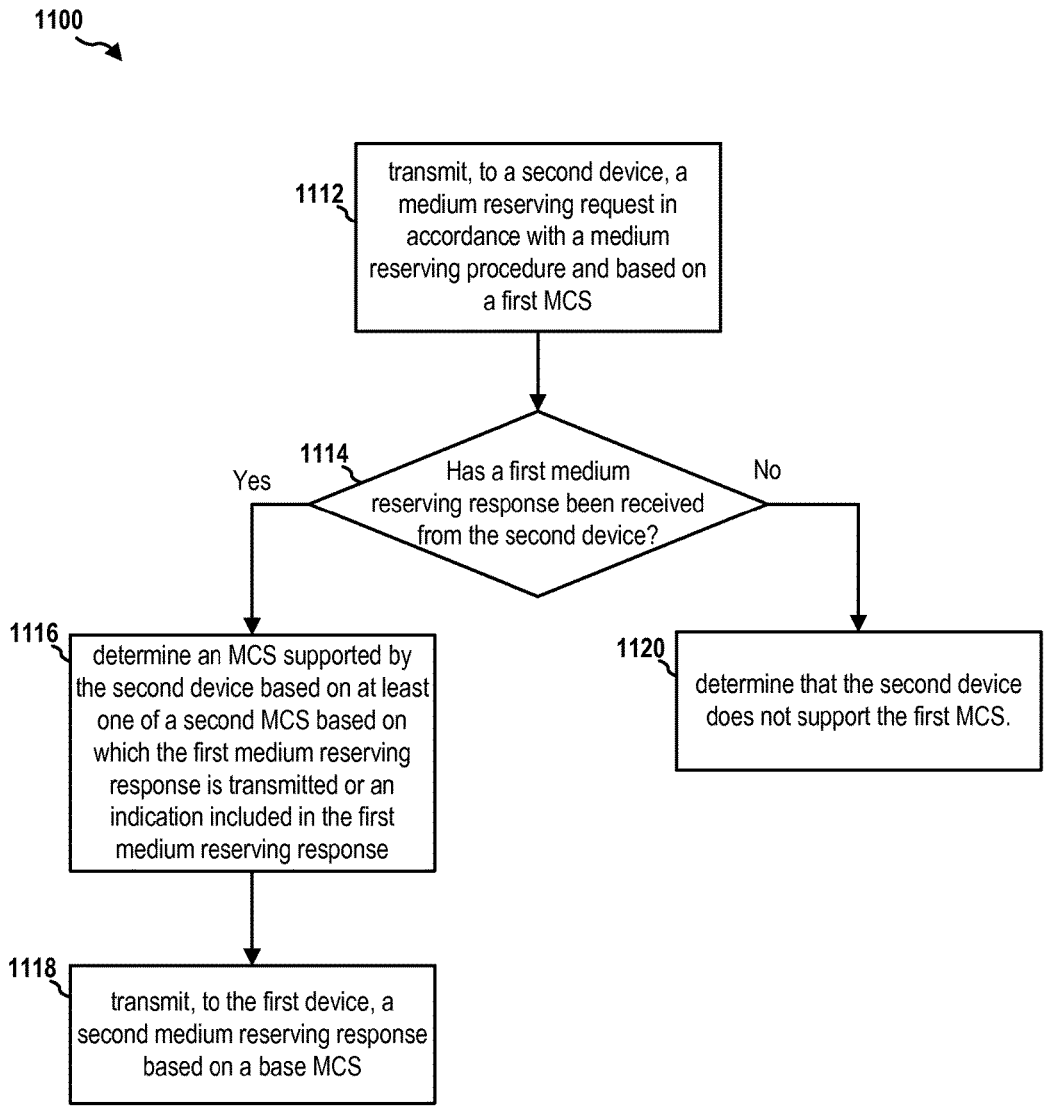
FIG. 11 is a flow chart of an exemplary method of wireless communication for using medium reserving procedure frames as a sounding mechanism.

FIG. 11 is a flow chart of an exemplary method 1100 of wireless communication for using medium reserving procedure frames (e.g., RTS/CTS) as a sounding mechanism. The method may be performed by a first device (e.g., the STA A 332, the AP A 310, the apparatus 1302/202). At operation 1112, the first device transmits, to a second device, a medium reserving request in accordance with a medium reserving procedure. The medium reserving request employs a first MCS. The medium reserving procedure reserves a medium for data transmission. At operation 1114, the first device determines whether a first medium reserving response in accordance with the medium reserving procedure has been received from the second device. When the first medium reserving response has been received by the first device, the first device, at operation 1116, determines an MCS supported by the second device based on at least one of a second MCS employed by the first medium reserving response or an indication included in the first medium reserving response. In certain configurations, at operation 1118, the first device transmits, to the first device, a second medium reserving response in accordance with the medium reserving procedure. The second medium reserving response employs a base MCS. When the first medium reserving response has not been received by the first device, the first device, at operation 1120, determines that the second device does not support the first MCS. For example, referring to FIG. 6, the RTS transmitter 602 sends an RTS to the RTS receiver 604, and the RTS receiver 604 sends a CTS to the RTS transmitter 602 in response. The RTS and the CTS are used as a sounding mechanism.

In certain configurations, the medium reserving procedure employs an RTS/CTS procedure. In certain configurations, the first MCS is a desired MCS of the first device. The second MCS is a base MCS. The MCS supported by the second device is determined to be the first MCS. In certain configurations, the first MCS is a desired MCS of the first device and the second MCS is the MCS supported by the second device. The MCS supported by the second device is determined to be the second MCS. In certain configurations, at least one of a preamble of the medium reserving request or a preamble of the first medium reserving response includes a NAV. In certain configurations, the first MCS and the second MCS each employ a base MCS. The medium reserving request includes an indication indicating a desired MCS of the first device. The MCS supported by the second device is determined to be the desired MCS of the first device. In certain configurations, the first MCS and the second MCS each are a base MCS. The medium reserving request includes an indication indicating a desired MCS of the first device. The indication included in the first medium reserving response indicates the MCS supported by the second device. In certain configurations, the first MCS is a desired MCS of the first device and the second MCS is an MCS that the second device is capable of supporting. The MCS supported by the second device is determined to be the second MCS. In certain configurations, the first MCS is a base MCS. The second MCS is a best MCS that the second device is capable of supporting. The MCS supported by the second device is determined to be the second MCS.

Figure 12:
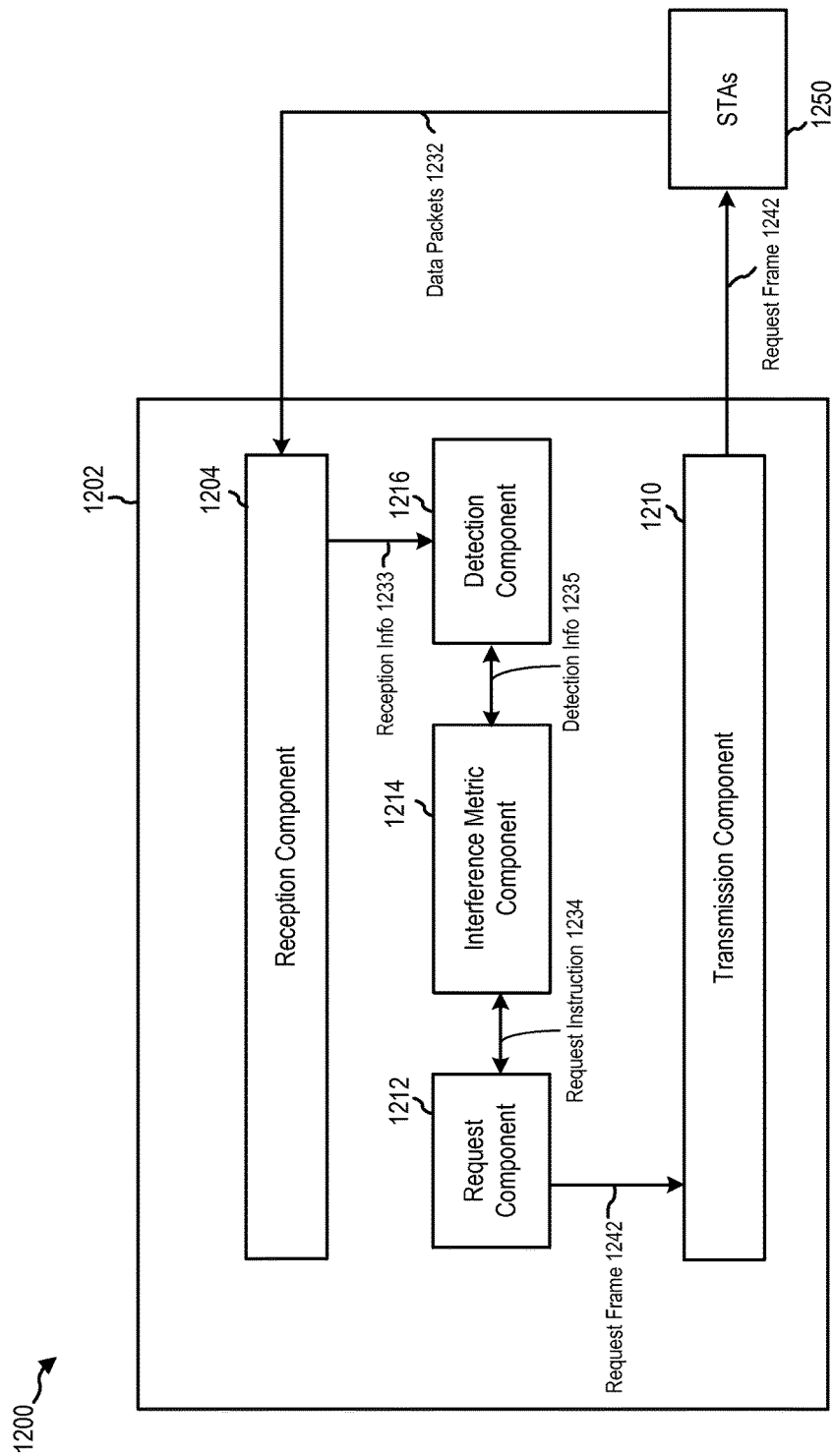
FIG. 12 is a conceptual data flow diagram illustrating the data flow between different components/means in an exemplary apparatus.

FIG. 12 is a conceptual data flow diagram 1200 illustrating the data flow between different components/means in an exemplary apparatus 1202. The apparatus 1202 may be an AP (e.g., the access point 104, the AP A 310). The apparatus 1202 includes a reception component 1204, a transmission component 1210, an request component 1212, an interference metric component 1214, and a detection component 1216. The apparatus 1202/202 may be in a BSS having a plurality of STAs 1250. The apparatus 1202/202 is communication with the plurality of STAs 1250 via the reception component 1204 and the transmission component 1210. The reception component 1204 may receive data packets 1232 from the plurality of STAs 1250. The detection component 1216 may monitor the operation at the reception component 1204 and may obtain reception information 1233 regarding the data packets 1232 from the reception component 1204. Based on the reception information 1233, the detection component 1216 may determine or obtain detection information 1235.

The detection component 1216 sends the detection information 1235 to the interference metric component 1214. The interference metric component 1214 determines an interference metric of the BSS. The interference metric indicates a degree of interference in the BSS caused by one or more hidden nodes associated with the plurality of STAs 1250.

The interference metric component 1214 determines whether the interference metric meets a request threshold. When the interference metric meets the threshold, the interference metric component 1214 may determine to request each of the plurality of STAs 1250 to enable a medium reserving procedure. The medium reserving procedure reserves a medium for data transmission. In certain configurations, the medium reserving procedure employs an RTS/CTS procedure.

More specifically, in certain configurations, the detection component 1216 determines, based on the reception information 1233, a number of STAs in the plurality of STAs 1250, The detection information 1235 sent to the interference metric component 1214 from the detection component 1216 includes the number of STAs in the plurality of STAs 1250. The interference metric component 1214 determines that the interference metric includes the number of STAs in the plurality of STAs 1250. The interference metric component 1214 further determines that the interference metric meets the request threshold when the number is greater than the threshold with respect to the number of STAs in the plurality of STAs 1250.

In certain configurations, the detection component 1216 determines, based on the reception information 1233, a number of STAs of the plurality of STAs 1250 that have active uplink traffic. The detection information 1235 sent to the interference metric component 1214 from the detection component 1216 includes the number of STAs that have active uplink traffic. The interference metric component 1214 determines that the interference metric includes the number of STAs that have active uplink traffic. The interference metric component 1214 further determines that the interference metric meets the request threshold when the number is greater than a threshold with respect to the number of STAs that have active uplink traffic.

In certain configurations, the detection component 1216 determines, from a configuration of the apparatus 1202/202 or a configuration received from the plurality of STAs 1250, a CCA ED threshold of the BSS. The detection information 1235 sent to the interference metric component 1214 from the detection component 1216 includes the CCA ED threshold. The interference metric component 1214 determines that the interference metric includes the CCA ED threshold. The interference metric component 1214 further determines that the interference metric meets the request threshold when the CCA ED threshold is greater than a CCA ED value. In certain configurations, the interference metric component 1214 may also increase a minimum size of a contention window when the CCA ED threshold is greater than the CCA ED value.

In certain configurations, the detection component 1216 determines, from an indication of the apparatus 1202/202 or an indication received from the plurality of STAs 1250, a configuration regarding whether the plurality of STAs 1250 defer to data packets from an OBSS. The detection information 1235 sent to the interference metric component 1214 from the detection component 1216 includes the configuration. The interference metric component 1214 determines that the interference metric includes the configuration. The interference metric component 1214 further determines that the interference metric meets the request threshold when the configuration indicates that the plurality of STAs 1250 do not defer to the data packets from the OBSS.

In certain configurations, the detection component 1216 determines, based on the reception information 1233, a distance of a STA of the plurality of STAs 1250 from the AP. The detection information 1235 sent to the interference metric component 1214 from the detection component 1216 includes the distance. The interference metric component 1214 determines that the interference metric includes the distance. The interference metric component 1214 further determines that the interference metric meets the request threshold when the distance is greater than a threshold with respect to the distance.

In certain configurations, the detection component 1216 determines, based on the reception information 1233, strength of a signal received from a STA of the plurality of STAs 1250. The detection information 1235 sent to the interference metric component 1214 from the detection component 1216 includes the strength. The interference metric component 1214 determines that the interference metric includes the strength. The interference metric component 1214 further determines that the interference metric meets the request threshold when the strength is less than a threshold with respect to the strength.

In certain configurations, the detection component 1216 determines, based on the reception information 1233, a distance of another AP from the AP. The detection information 1235 sent to the interference metric component 1214 from the detection component 1216 includes the distance. The interference metric component 1214 determines that the interference metric includes the distance. The interference metric component 1214 further determines that the interference metric meets the request threshold when the distance is less than a threshold with respect to the distance.

In certain configurations, the detection component 1216 determines, based on the reception information 1233, strength of a signal received from another AP. The detection information 1235 sent to the interference metric component 1214 from the detection component 1216 includes the strength. The interference metric component 1214 determines that the interference metric includes the strength. The interference metric component 1214 further determines that the interference metric meets the request threshold when the strength is greater than a threshold with respect to the strength.

In certain configurations, the detection component 1216 determines, based on the reception information 1233, an effective distance of the BSS with respect to an OBSS. The effective distance is a predetermined function of relative distances among at least one STA of the BSS, the AP, an AP of the OBSS, and at least one STA of the OBSS. The detection information 1235 sent to the interference metric component 1214 from the detection component 1216 includes the distance. The interference metric component 1214 determines that the interference metric includes the effective distance. The interference metric component 1214 further determines that the interference metric meets the request threshold when the effective distance is less than a threshold with respect to the effective distance.

Accordingly, the interference metric component 1214 sends a request instruction 1234 to the request component 1212. The request component 1212 constructs a request frame 1242 and sends the request frame 1242 to the transmission component 1210. The request frame 1242 includes an indicator indicating to each of the plurality of STAs 1250 to enable the medium reserving procedure. In certain configurations, the request frame 1242 is a management frame or a beacon frame. The indicator is included in an IE of the request frame 1242. The transmission component 1210 transmits the request frame 1242 to the plurality of STAs 1250.

The apparatus may include additional components that perform each of the blocks of the algorithm in the aforementioned flowcharts of FIGS. 9-11. As such, each block in the aforementioned flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The request component 1212, the interference metric component 1214, and the detection component 1216 may constitute the MRP component 224 shown in FIG. 2. The request component 1212, the interference metric component 1214, and the detection component 1216 may employ the processor 204, the memory 206, the signal detector 218, the DSP 220, and/or the user interface 222. The reception component 1204 and the transmission component 1210 may employ the processor 204, the memory 206, the signal detector 218, and/or the DSP 220. The transceiver 214 receives a signal from the one or more antennas 216, extracts information from the received signal, and provides the extracted information to the reception component 1204. In addition, the transceiver 214 receives information from the transmission component 1210, and based on the received information, generates a signal to be applied to the one or more antennas 216.

In one aspect, the apparatus 1202/202 may be an AP. The apparatus 1202/202 may be configured to include means for performing the operations illustrated in FIGS. 9-11. More specifically, the apparatus 1202/202 may be configured to include means for determining an interference metric of a BSS having a plurality of STAs. The apparatus 1202/202 is in the BSS. The interference metric indicates a degree of interference in the BSS caused by one or more hidden nodes associated with the plurality of STAs. The apparatus 1202/202 may be configured to include means for determining whether the interference metric meets a threshold. The apparatus 1202/202 may be configured to include means for transmitting, to the plurality of STAs, a frame including an indicator when the interference metric meets the threshold. The indicator indicates to each of the plurality of STAs to enable a medium reserving procedure. The medium reserving procedure reserves a medium for data transmission.

In certain configurations, the medium reserving procedure employs an RTS/CTS procedure. In certain configurations, the interference metric includes a number of STAs in the plurality of STAs. The interference metric is determined to meet the threshold when the number is greater than the threshold. In certain configurations, the interference metric includes a number of STAs of the plurality of STAs that have active uplink traffic. The interference metric is determined to meet the threshold when the number is greater than the threshold. In certain configurations, the interference metric includes a CCA ED threshold of the BSS. The interference metric is determined to meet the threshold when the CCA ED threshold is greater than the threshold. In certain configurations, the apparatus 1202/202 may be configured to include means for increasing a minimum size of a contention window when the CCA ED threshold is greater than the threshold. In certain configurations, the interference metric includes a configuration of the plurality of STAs for deferring to data packets from an OBSS. The interference metric is determined to meet the threshold when the configuration indicates that the plurality of STAs do not defer to the data packets from the OBSS.

In certain configurations, the interference metric includes a distance of a STA of the plurality of STAs from the apparatus 1202/202. The interference metric is determined to meet the threshold when the distance is greater than the threshold. In certain configurations, the interference metric includes strength of a signal received from a STA of the plurality of STAs. The interference metric is determined to meet the threshold when the strength is less than the threshold. In certain configurations, the interference metric includes a distance of another AP from the apparatus 1202/202. The interference metric is determined to meet the threshold when the distance is less than the threshold. In certain configurations, the interference metric includes strength of a signal received from another AP. The interference metric is determined to meet the threshold when the strength is greater than the predetermined threshold. In certain configurations, the interference metric includes an effective distance of the BSS with respect to an OBSS. The effective distance is a predetermined function of relative distances among at least one STA of the BSS, the apparatus 1202/202, an AP of the OBSS, and at least one STA of the OBSS. The interference metric is determined to meet the threshold when the effective distance is less than the predetermined threshold. In certain configurations, the frame is a management frame or a beacon frame. The indicator is included in an IE of the frame.

The aforementioned means may be one or more of the aforementioned components of the apparatus 1202/202 configured to perform the functions recited by the aforementioned means. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 13:
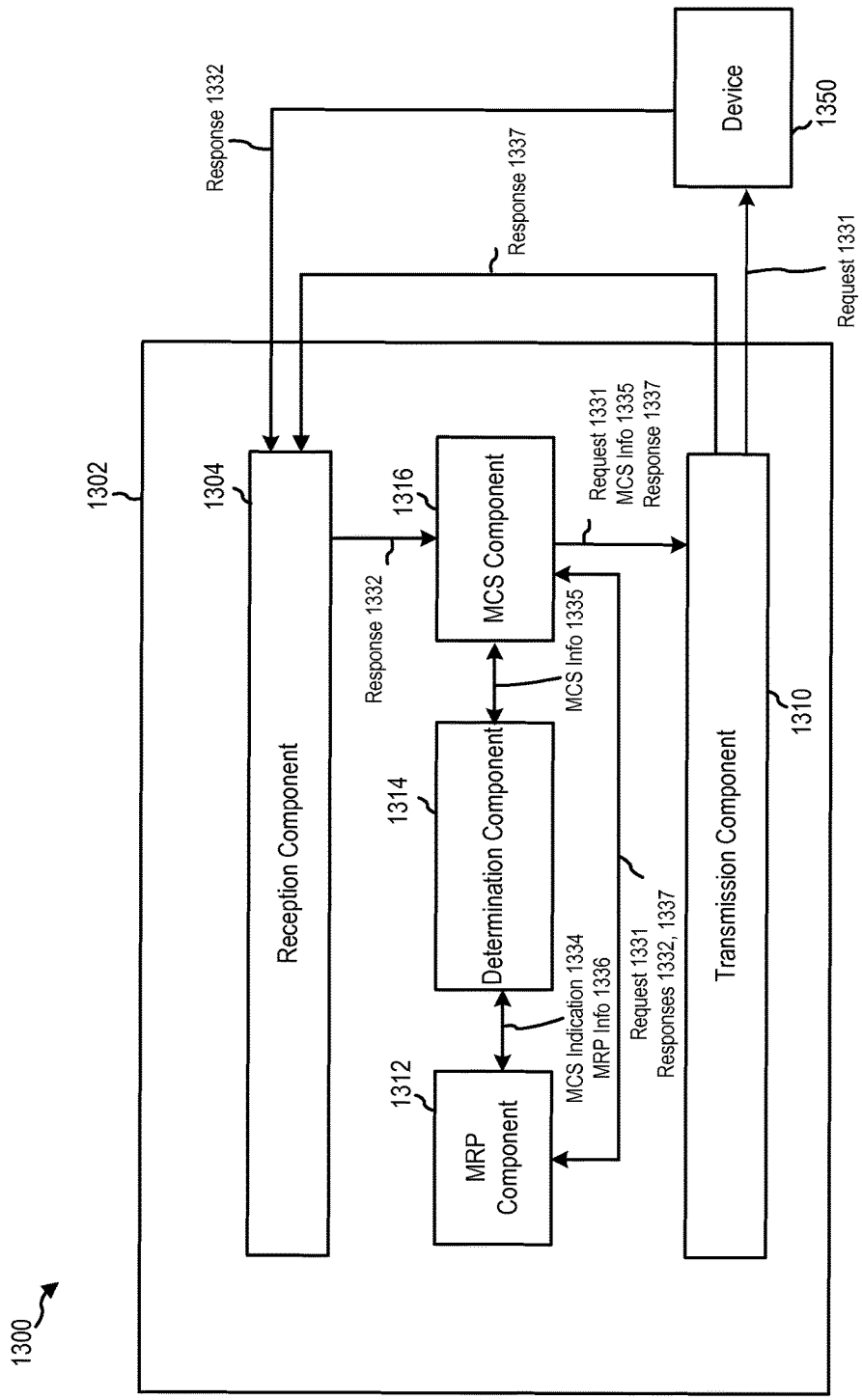
FIG. 13 is a conceptual data flow diagram illustrating the data flow between different components/means in another exemplary apparatus.

FIG. 13 is a conceptual data flow diagram 1300 illustrating the data flow between different components/means in an exemplary apparatus 1302. The apparatus 1302 may be a first device (e.g., the station 114, the access point 104, the AP A 310, the STA A 332). The apparatus 1302 includes a reception component 1304, a transmission component 1310, an MRP component 1312, a determination component 1314, and an MCS component 1316. The apparatus 1302/202 is communication with the second device 1350 via the reception component 1304 and the transmission component 1310. The MRP component 1312 may construct a medium reserving request 1331 of a medium reserving procedure. The medium reserving procedure reserves a medium for data transmission. In certain configurations, the medium reserving procedure employs an RTS/CTS procedure. The determination component 1314 may determine that the medium reserving request 1331 is to be transmitted based on a first MCS. The determination component 1314 may send an MCS information 1335 to the MCS component 1316. The MRP component 1312 may send the medium reserving request 1331 to the MCS component 1316. The MCS component 1316 may learn the first MCS to be used to transmit the medium reserving request 1331 based on the MCS information 1335. Accordingly, the MCS component 1316 may encode the medium reserving request 1331 in accordance with the first MCS. The MCS component 1316 may send the medium reserving request 1331 and the MCS information 1335 to the transmission component 1310. The transmission component 1310 may accordingly modulate the medium reserving request 1331. The transmission component 1310 then transmits, to the second device 1350, the medium reserving request 1331 in accordance with the medium reserving procedure and based on the first MCS.

The reception component 1304 may or may not receive, from the second device 1350, a first medium reserving response 1332 in response to the medium reserving request 1331. When the first medium reserving response 1332 has been received, the reception component 1304 then transmits the received first medium reserving response 1332 to the MCS component 1316. The reception component 1304 and the MCS component 1316 may demodulate and decode the first medium reserving response 1332. The MCS component 1316 may obtain MCS information 1335 regarding a second MCS based on which the first medium reserving response 1332 is transmitted. Then, the MCS component 1316 sends the MCS information 1335 regarding the second MCS to the determination component 1314 and sends the first medium reserving response 1332 to the MRP component 1312. Accordingly, the MRP component 1312 receives the first medium reserving response 1332 and accordingly knows that the first medium reserving response 1332 has been received from the second device 1350. The MRP component 1312 may also extract an MCS indication 1334 included in the first medium reserving response 1332. The MRP component 1312 may send the MCS indication 1334 to the determination component 1314. The determination component 1314 may determine an MCS supported by the second device 1350 based on at least one of a second MCS or the MCS indication 1334.

When the first medium reserving response 1332 has not been received by the reception component 1304, the MRP component 1312 also would not receive the first medium reserving response 1332 and may determine that the first medium reserving response 1332 has not been received. The MRP component 1312 may send to the determination component 1314 corresponding MCS information 1335 indicating that the first medium reserving response 1332 has not been received. The determination component 1314 may accordingly determine, based on the MCS information 1335, that the second device 1350 does not support the first MCS.

Further, the determination component 1314 may determine to send to the apparatus 1302/202 (e.g., the reception component 1304) a second medium reserving response 1337 in accordance with the medium reserving procedure. The second medium reserving response 1337 is to be transmitted based on the base MCS. Accordingly, the determination component 1314 sends MRP information 1336 to the MRP component 1312. The MRP component 1312 constructs the second medium reserving response 1337 and sends the second medium reserving response 1337 to the MCS component 1316. The determination component 1314 sends MCS information 1335 regarding the base MCS to be used for transmitting the second medium reserving response 1337. Accordingly, the MCS component 1316 may encode the medium reserving request 1331 in accordance with the base MCS. The MCS component 1316 may send the second medium reserving response 1337 and the MCS information 1335 to the transmission component 1310. The transmission component 1310 may accordingly modulate the second medium reserving response 1337. The transmission component 1310 then transmits, to the apparatus 1302/202 (e.g., the reception component 1304), the second medium reserving response 1337 in accordance with the medium reserving procedure and based on the base MCS.

In certain configurations, the first MCS is a desired MCS of the first device. The second MCS is a base MCS. The MCS supported by the second device 1350 is determined to be the first MCS. In certain configurations, the first MCS is a desired MCS of the first device and the second MCS is the MCS supported by the second device. The MCS supported by the second device 1350 is determined to be the second MCS. In certain configurations, at least one of a preamble of the medium reserving request or a preamble of the first medium reserving response 1332 includes a NAV. In certain configurations, the first MCS and the second MCS each are the base MCS. The medium reserving request includes an indication indicating a desired MCS of the first device. The MCS supported by the second device 1350 is determined to be the desired MCS of the apparatus 1302/202 when the MRP component 1312 receives the first medium reserving response 1332. In certain configurations, the first MCS and the second MCS each are a base MCS. The medium reserving request includes an indication indicating a desired MCS of the first device. The indication included in the first medium reserving response 1332 indicates the MCS supported by the second device 1350. In certain configurations, the first MCS is a desired MCS of the first device and the second MCS is an MCS that the second device is capable of supporting. The MCS supported by the second device 1350 is determined to be the second MCS. In certain configurations, the first MCS is a base MCS. The second MCS is a best MCS that the second device is capable of supporting. The MCS supported by the second device 1350 is determined to be the second MCS.

The apparatus may include additional components that perform each of the blocks of the algorithm in the aforementioned flowcharts of FIGS. 9-11. As such, each block in the aforementioned flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The MRP component 1312, the determination component 1314, and the MCS component 1316 may constitute the MRP component 224 shown in FIG. 2. The MRP component 1312, the determination component 1314, and the MCS component 1316 may employ the processor 204, the memory 206, the signal detector 218, the DSP 220, and/or the user interface 222. The reception component 1304 and the transmission component 1310 may employ the processor 204, the memory 206, the signal detector 218, and/or the DSP 220. The transceiver 214 receives a signal from the one or more antennas 216, extracts information from the received signal, and provides the extracted information to the reception component 1304. In addition, the transceiver 214 receives information from the transmission component 1310, and based on the received information, generates a signal to be applied to the one or more antennas 216.

In one aspect, the apparatus 1302/202 may be a first device. The apparatus 1302/202 may be configured to include means for performing the operations illustrated in FIGS. 9-11. More specifically, the apparatus 1302/202 may be configured to include means for transmitting, to a second device, a medium reserving request in accordance with a medium reserving procedure and based on a first MCS. The medium reserving procedure reserves a medium for data transmission. The apparatus 1302/202 may be configured to include means for determining whether a first medium reserving response in accordance with the medium reserving procedure has been received from the second device. The apparatus 1302/202 may be configured to include means for determining, when the first medium reserving response has been received by the first device, an MCS supported by the second device based on at least one of (a) a second MCS based on which the first medium reserving response is transmitted or (b) an indication included in the first medium reserving response. In certain configurations, the apparatus 1302/202 may be configured to include means for determining, when the first medium reserving response has not been received by the first device, that the second device does not support the first MCS. In certain configurations, the medium reserving procedure employs an RTS/CTS procedure.

In certain configurations, the first medium reserving response has been received by the first device. The first MCS is a desired MCS of the first device. The second MCS is a base MCS. The MCS supported by the second device is determined to be the first MCS. The apparatus 1302/202 may be configured to include means for transmitting, to the first device, a second medium reserving response in accordance with the medium reserving procedure, the second medium reserving response being transmitted based on the base MCS. In certain configurations, the first MCS is a desired MCS of the first device and the second MCS is the MCS supported by the second device. The MCS supported by the second device is determined to be the second MCS. The apparatus 1302/202 may be configured to include means for transmitting, to the first device, a second medium reserving response in accordance with the medium reserving procedure. The second medium reserving response is transmitted based on a base MCS. In certain configurations, at least one of a preamble of the medium reserving request or a preamble of the first medium reserving response includes a NAV.

In certain configurations, the first MCS and the second MCS each are a base MCS. The medium reserving request includes an indication indicating a desired MCS of the first device. The MCS supported by the second device is determined to be the desired MCS of the first device. In certain configurations, the first MCS and the second MCS each are a base MCS. The medium reserving request includes an indication indicating a desired MCS of the first device. The indication included in the first medium reserving response indicates the MCS supported by the second device. In certain configurations, the first MCS is a desired MCS of the first device and the second MCS is an MCS that the second device is capable of supporting. The MCS supported by the second device is determined to be the second MCS. The apparatus 1302/202 may be configured to include means for transmitting a second medium reserving response in accordance with the medium reserving procedure to the first device, the second medium reserving response being transmitted based on a base MCS. In certain configurations, the first MCS is a base MCS. The second MCS is a best MCS that the second device is capable of supporting. The MCS supported by the second device is determined to be the second MCS.

The aforementioned means may be one or more of the aforementioned components of the apparatus 1302/202 configured to perform the functions recited by the aforementioned means. The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that components, modules, and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication of an access point (AP), comprising:
   determining an interference metric of a basic service set (BSS) having a plurality of stations (STAs), the AP being in the BSS, the interference metric indicating a degree of interference in the BSS;
   determining whether the interference metric meets a threshold;
   transmitting, to the plurality of STAs, a frame including at least one indicator when the interference metric meets the threshold, the at least one indicator indicating to each of the plurality of STAs to enable a medium reserving procedure; and
   transmitting a medium reserving frame in accordance with the medium reserving procedure, wherein the medium reserving frame includes generation information indicative of a first generation of the access point, wherein the generation information indicates that devices of a second generation are to defer to transmissions associated with the first generation, the second generation being relatively later than the first generation.

2. The method of claim 1, wherein the medium reserving procedure employs a Request-to-Send (RTS)/Clear-to-Send (CTS) procedure.

3. The method of claim 1, wherein the interference metric comprises a number of STAs in the plurality of STAs, wherein the interference metric is determined to meet the threshold when the number is greater than the threshold.

4. The method of claim 1, wherein the interference metric comprises a number of STAs of the plurality of STAs that have active uplink traffic, and wherein the interference metric is determined to meet the threshold when the number is greater than the threshold.

5. The method of claim 1, wherein the interference metric comprises a clear channel assessment (CCA) energy detection (ED) threshold of the BSS, and wherein the interference metric is determined to meet the threshold when the CCA ED threshold is greater than the threshold, the method further comprising:
   increasing a minimum size of a contention window when the CCA ED threshold is greater than the threshold.

6. The method of claim 1, wherein the interference metric comprises a configuration of the plurality of STAs for deferring to data packets from an overlapping BSS (OBSS), and wherein the interference metric is determined to meet the threshold when the configuration indicates that the plurality of STAs do not defer to the data packets from the OBSS.

7. The method of claim 1, wherein the interference metric comprises a distance of a STA of the plurality of STAs from the AP, and wherein the interference metric is determined to meet the threshold when the distance is greater than the threshold.

8. The method of claim 1, wherein the interference metric comprises strength of a signal received from a STA of the plurality of STAs, and wherein the interference metric is determined to meet the threshold when the strength is less than the threshold.

9. The method of claim 1, wherein the interference metric comprises a distance of another AP from the AP, and wherein the interference metric is determined to meet the threshold when the distance is less than the threshold.

10. The method of claim 1, wherein the interference metric comprises strength of a signal received from another AP, and wherein the interference metric is determined to meet the threshold when the strength is greater than the threshold.

11. The method of claim 1, wherein the interference metric comprises an effective distance of the BSS with respect to an overlapping BSS (OBSS), wherein the effective distance is a predetermined function of relative distances among at least one STA of the BSS, the AP, an AP of the OBSS, and at least one STA of the OBSS, and wherein the interference metric is determined to meet the threshold when the effective distance is less than the threshold.

12. The method of claim 1, wherein the frame is a management frame or a beacon frame, wherein the indicator is included in an information element (IE) of the frame.

13. An apparatus for wireless communication, the apparatus being an access point (AP), comprising:
a memory; and
at least one processor coupled to the memory, wherein the at least one processor is configured to:
determine an interference metric of a basic service set (BSS) having a plurality of stations (STAs), the AP being in the BSS, the interference metric indicating a degree of interference in the BSS;
determine whether the interference metric meets a threshold; and
transmit, to the plurality of STAs when the interference metric meets the threshold, a frame including at least one indicator indicating to each of the plurality of STAs to enable a medium reserving procedure; and
transmit a medium reserving frame in accordance with the medium reserving procedure, wherein the medium reserving frame includes generation information indicative of a first generation of the access point, wherein the generation information indicates that devices of a second generation are to defer to transmissions associated with the first generation, the second generation being relatively later than the first generation.

14. The apparatus of claim 13, wherein the medium reserving procedure employs a Request-to-Send (RTS)/Clear-to-Send (CTS) procedure.

15. The apparatus of claim 13, wherein the interference metric comprises a number of STAs in the plurality of STAs, wherein the interference metric is determined to meet the threshold when the number is greater than the threshold.

16. The apparatus of claim 13, wherein the interference metric comprises a number of STAs of the plurality of STAs that have active uplink traffic, and wherein the interference metric is determined to meet the threshold when the number is greater than the threshold.

17. The method of claim 1, wherein the devices of the second generation are associated with an overlapping BSS (OBSS).

* * * * *